US012084741B2

(12) United States Patent
Bisson

(10) Patent No.: US 12,084,741 B2
(45) Date of Patent: Sep. 10, 2024

(54) SUPPORT DEVICE FOR RADIANT TUBES

(71) Applicant: Massimiliano Bisson, Tezze sul Brenta (IT)

(72) Inventor: Massimiliano Bisson, Tezze sul Brenta (IT)

( * ) Notice: Subject to any disclaimer, the term of this patent is extended or adjusted under 35 U.S.C. 154(b) by 819 days.

(21) Appl. No.: 17/256,061

(22) PCT Filed: Jun. 25, 2019

(86) PCT No.: PCT/IB2019/055346
§ 371 (c)(1),
(2) Date: Dec. 24, 2020

(87) PCT Pub. No.: WO2020/003125
PCT Pub. Date: Jan. 2, 2020

(65) Prior Publication Data

US 2021/0147958 A1 May 20, 2021

(30) Foreign Application Priority Data

Jun. 26, 2018 (IT) ........................ 102018000006668

(51) Int. Cl.
*C21D 9/56* (2006.01)
*C21D 1/52* (2006.01)
(Continued)

(52) U.S. Cl.
CPC ............... *C21D 9/562* (2013.01); *C21D 1/52* (2013.01); *F27B 3/20* (2013.01); *F27B 9/068* (2013.01); *F27D 99/0035* (2013.01)

(58) Field of Classification Search
CPC ........ C21D 9/562; C21D 1/52; C21D 9/0006; F27B 3/20; F27B 9/068; F27D 99/0035
(Continued)

(56) References Cited

U.S. PATENT DOCUMENTS

2011/0120453 A1 5/2011 Wunning et al.
2021/0147958 A1* 5/2021 Bisson .................. C21D 9/562

FOREIGN PATENT DOCUMENTS

AT 508 368 A4 1/2011
CN 206 635 373 U 11/2017
(Continued)

OTHER PUBLICATIONS

International Search Report for PCT/IB2019/055346 dated Sep. 3, 2019 (3 pages).

*Primary Examiner* — Jessee R Roe
*Assistant Examiner* — Michael Aboagye
(74) *Attorney, Agent, or Firm* — Tutunjian & Bitetto, P.C.

(57) ABSTRACT

Support device for a radiant pipe (TR), usable in thermal treatment furnaces, for lines for continuous galvanising and annealing of metal strips or sheets and/or other products made of steel and/or other metals or for revamping pre-existing furnaces, including a support for radiant pipe or shank and a furnace-side support or socket, wherein the support for the radiant pipe or shank includes at least one outer surface, facing—during use—towards the furnace-side support or socket and a thickness, wherein the furnace-side support or socket includes at least one first surface and one second surface, the latter facing—during use—towards the support for radiant pipe or shank, and a thickness, including at least one rotary means and at least one seat for housing the at least one rotary means.

20 Claims, 11 Drawing Sheets

(51) Int. Cl.
*F27B 3/20* (2006.01)
*F27B 9/06* (2006.01)
*F27D 99/00* (2010.01)

(58) Field of Classification Search
USPC .......................................................... 266/105
See application file for complete search history.

(56) References Cited

FOREIGN PATENT DOCUMENTS

| | | | |
|---|---|---|---|
| EP | 2 825 831 | A1 | 1/2015 |
| JP | H11 257612 | A | 9/1999 |
| KR | 2005 0017781 | A | 2/2005 |
| WO | 2017025333 | A1 | 2/2017 |

* cited by examiner

SUPPORT DEVICE FOR RADIANT TUBES

TECHNICAL FIELD OF THE INVENTION

The present invention regards a support device for radiant pipes for industrial plants and the like, usable in the furnaces or steel and/or other metals thermal treatment plants industry.

More in particular, the present invention regards a support device for radiant pipes usable in thermal treatment furnaces in general, lines for continuous galvanising and annealing (CGL, AGL, CAPL or CAL lines etc.) of strips or panels made of metal sheet, bolts, hoses, pipes, components for pipes and fittings, treatment and production of "Advanced High Strength Steel" (AHSS) and "new steel grades" and/or other products made of steel and/or made of other metals.

Furthermore, the support device for radiant pipes according to the present invention is used both for the new lines for continuous galvanising and annealing (CGL, AGL, CAPL or CAL lines etc.) and for revamping old lines for continuous galvanising and annealing (CGL, AGL, CAPL or CAL lines etc.) and in any thermal treatment furnace in general.

STATE OF THE PRIOR ART

In the steel thermal treatment industry, in particular the treatment of sheets and the derivatives thereof, particular types of radiant pipes, made of material resistant to high temperatures, so that then sheet that passes, in form of continuous web, in proximity thereof, can be subjected to the desired thermal treatment, are used.

The radiant pipes usually used in the industry may take different shapes, the most common of which can be defined as "I-shaped", "U-shaped", "double U-shaped", "W-shaped" or "M-shaped", single "P-shaped", "double P-shaped", double "M-shaped". In the continuous lines of galvanising and annealing plants provided with the aforementioned radiant pipes, due to the high operating temperatures, which reach an average between 500° C. and 1250° C., there arises problems related both to the sticking of the support of the radiant pipe on the support installed and welded on the furnace side, the so-called "furnace-side support" or "socket" and due to the vibrations caused by the operation of the pipe which determines the lateral movement thereof (to the right and/or to the left). In such situations, oscillating on the socket the radiant pipe, due to the aforementioned vibrations, and expanding due to the high operating temperatures (considering that the natural extension of the radiant pipe generally ranges between 1 to 7 cm at 950° C.), comes into contact with the walls of the socket, generating a sliding along them, with ensuing increase of friction and temperature at the points of contact.

The sliding and settling difficulty relating to the expansion and oscillation to which the radiant pipe is subjected, alongside the friction and temperature increase present at the points of contact between the support for the radiant pipe and the furnace-side support, scratching and damaging the contact surfaces, leading to possible seizure and hence unusual stresses on the radiant pipe. This determines that the support itself generates thrust forces on the radiant pipe side on which it is applied—which is usually curvilinear-shaped—thus causing the deformation, the distortion thereof, up to the breaking thereof with ensuing collapse of the radiant pipe. Such phenomenon is also referred to as the "jamming" effect of the support of the radiant pipe and it may occur on the base surface of the furnace-side support as well as laterally, when the support for the radiant pipe rests against the lateral walls of the furnace-side support, due to the aforementioned vibrations.

In detail, due to the extension difficulties arising from the sticking of the two materials (the support for radiant pipe and the socket) and/or the oscillations, there occurs a twisting or deformation of the support, which definitely stops extending on the socket "jamming" thereon and thus fully causing the impossibility of the radiant pipe to find a space for the natural extension thereof. In such situation, as mentioned, the pipe pushes the support which, being blocked inside the furnace-side support, "jams" in the portion (usually curvilinear) of the hose on which it is installed, which, due to the high temperatures to which it is subjected, has low impact absorption and mechanical resistance capacities. This leads to the total collapse of the radiant pipe, as mentioned previously.

Proposed up to date have been some devices aimed at overcoming such drawbacks. However, none of the attempts developed up to date have borne the expected results.

Document KR 2005 0017781 A, for example describes a device for supporting a radiant pipe, which can be used in thermal treatment furnaces. Such device is said to be capable of extending the life of the radiant pipe by interposing rotary means between the support member positioned on one side of the curved surface of the radiant pipe and a support member positioned at the inner side of the furnace body. However, such patent describes some variants in which the rotary means are simply positioned between the support member of the radiant pipe and the furnace-side support member, without any constraint or engagement to such members, such as simple spacer means. However, in such case the rotary means are free to move, with the risk of the same projecting from the place where they were positioned—hence losing the functionality thereof—both due to possible expansions or movements of the radiant pipe and due to displacements during maintenance. In the latter case, there arises safety-related risks even for specialised personnel in that, for example in case of interventions to be carried out in the furnace, these rotary means, considerably heavy, could fall and hit the maintenance men. Furthermore, the sliding seat of the shank on the free rotating means is never the same and, thus, such free rotating means cannot guarantee a balancing or uniform distribution of the weight on the shank/socket contact area leading to even greater stress on the system and on the radiant pipe.

Furthermore, such solution does not seem capable of preventing a friction caused by the extension and/or expansion movement of the radiant pipe in favour of the rolling friction, despite the presence of rotary means, due to the disadvantages outlined above, and thus it does not seem to be effectively capable of preventing the jamming and sticking phenomena relating to the radiant pipe, also considering that the contact of rotary means made of steel on the material of radiant pipes (and thus on a similar material) tends to produce sticking rather than friction-less sliding.

Document AT 508 368 A4 describes a device for the thermal treatment of metal sheet strips, comprising at least one radiant pipe unit—having three pipes arranged on a common plane parallel to the metal sheet strip, connected to each other by two curved tubular portions—and a support element connected to the two curved tubular portions. The support element is engaged in a socket (on the furnace side) in an axially displaceable manner: between the two engagement surfaces there is a flat insert which forms a "compulsory" sliding layer for the support element and the socket. Such flat insert is made of or coated with a ceramic material so as to reduce the friction between the shank and socket and it is fixed to the latter by means of the elements that facilitate the removal thereof, once it is damaged due to the operation. Furthermore, such ceramic elements or ceramic-coated elements due to the operation (i.e. the friction between them and the shank of the radiant pipe) are bound to have a very short duration (1 year or slightly more up to a maximum of 2 or 3 years) and thus require continuous maintenance or change of the ceramic parts.

It is thus clear that there is a strong need for providing a device for radiant pipe capable of overcoming the drawbacks of the prior art outlined above.

SUMMARY OF THE INVENTION

Thus, the present invention has the technical task of improving the state of the prior art.

In the context of such technical task, an object of the present invention lies in providing a support device for radiant pipes that allows preventing seizure and jamming phenomena, both central and lateral, of the radiant pipe caused by the extension due to the thermal expansion or dilation of the support device for radiant pipe and/or the vibrations to which it is subjected and/or in the fact that the material of the support device for radiant pipe and that of the socket melt at high temperatures and stick hence no longer allowing the radiant pipe to slide, and thus, causing the deformation thereof (as a matter of fact, the pipe stretches and deforms upon cooling or change of cycle of the line).

A further object of the present invention lies in providing a support device for radiant pipes capable of moving on the furnace-side support or socket, both by means of sliding and by means of radial or lateral displacement always maintaining the same support seat on at least one of the two elements (socket or shank) such to balance the stress due to the weight to be borne (radiant pipe).

Yet another object of the present invention lies in providing a support device for radiant pipes in which the support of the radiant pipe has a relative rolling friction with the furnace-side support through the presence of the rotary means arranged between them.

This and other objects are attained by the support device for a radiant pipe according to the present application Further characteristics and advantages are described in the present application.

BRIEF DESCRIPTION OF THE DRAWINGS

The characteristics of the invention will be clearer to any man skilled in the art from the following description and from the attached drawings, provided by way of non-limiting example, wherein.

DETAILED DESCRIPTION OF THE INVENTION

Figure 1A:
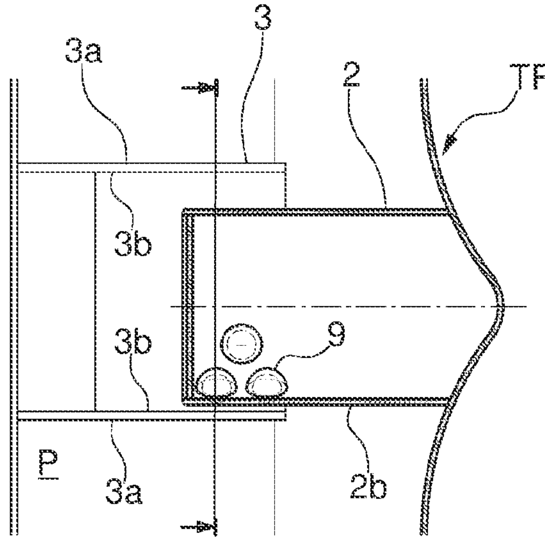
FIG. 1A is a partially sectioned lateral view of an embodiment of a support device for a radiant pipe according to the present invention.

With reference to the attached figures, a support device for a radiant pipe TR, usable in thermal treatment furnaces, for lines for the continuous galvanising and annealing of metal strips or sheets and/or other products made of steel and/or made of other metals, in particular CGL, AGL. CAPL or CAL lines etc. is indicated with 1.

The support device 1 comprises a support for radiant pipe or shank 2 and a furnace-side support or socket 3.

The socket 3 consists, in at least one version, of a compartment in which the shank 2 is positioned and/or moves. Such socket 3 comprises at least one portion or surface 3*b* usually suitable to come into contact with the shank 2; furthermore, the body of the socket 3 is usually positioned at least beneath the shank 2 to support the weight of the shank 2 and of the radiant pipe TR connected to the shank 2. The support for radiant pipe or shank 2 and/or the furnace-side support or socket 3 can be made of a metal material resistant to high temperatures, such as: an austenitic steel material, a high or low nickel content steel material (or high nickel alloy), a ceramic material, a silicon carbide material, etcetera.

Such materials have a thermal dilation comprised between 0 mm and 20 mm or greater, depending on the operating temperatures and the shape thereof.

They are also obtained by means of casting, melting, forging, rolling, etcetera.

Other materials that can be used are: a metallic material such as a nickel and chromium alloy, for example an alloy known by the trade name Inconel 600, 601 or 602, Incoloy 800. Incoloy 800H, AISI-304, -310. -309, -309S, -316. -316Ti, -330, -321, AVESTA235MA, ALUFER, ALLOY X, an iron, chromium and aluminium alloy, such as an alloy known by the trade name “Kanthal material” (for example APM. APMT, etcetera), a metallic material and/or a metal alloy comprising an element such as tungsten, cobalt, yttrium, molybdenum, etcetera, for example known by the name “Mitsubishi material” (for example MA230, MA250. MA600, MA601, etcetera), an alloy known by the trade name “Haynes 230”, or “Inconel” 617, 625, 718, etcetera, or a material containing and/or derived from the cast iron, for example a high nickel content cast iron such as the one known by the trade name “Ghisa Ni-resist”, with the lost-wax technique, with silica carbides, ceramic pipes, etcetera.

The support for radiant pipe or shank 2 and/or the furnace-side support or socket 3 can be made of a metallic material and/or molten material (such as for example molten metallic material, for example by centrifugation) with or without nickel, chromium, aluminium components, etcetera, like the ones known by the name Gx40CrNi 26-20, KHR48N, KHR35H, etcetera, and/or other materials suitable for the purpose. In at least one version of the invention, the socket 3 could also be obtained using the material that forms the wall P of the furnace, such as bricks, stone, materials consisting of insulating material, refractory materials, etc.

The radiant pipe connected to the shank 2 can be made of one of the materials listed above.

Furthermore, the support for radiant pipe or shank 2, the radiant pipe and the furnace-side support or socket 3 may comprise any combination of the materials listed above.

The furnace-side support or socket 3 is a support constrained (for example fixed and/or welded) to a wall P of the furnace or obtained therein.

Thanks to the present invention, the shank 2 is movable and/or slidable in the socket 3 or on socket 3.

The present invention further comprises at least one rotary means 4 suitable to determine the movement of the shank 2 on the socket 3.

In this sense, the at least one rotary means 4 constitutes an element that is suitable to prevent the jamming and/or sticking of the shank 2 on the socket 3, for example—as mentioned—due to the high operating temperatures and/or the oscillations to which the radiant pipe TR is subjected.

Furthermore, the at least one rotary means 4 allows the support of the radiant pipe TR and/or the sliding and/or oscillation movements thereof.

The socket 3 determines a first longitudinal direction, starting from the wall of the furnace towards the radiant pipe TR and a transversal direction, perpendicular to the longitudinal direction.

Hereinafter, unless indicated otherwise the expression configuration of the socket 3 shall be used to indicate the shape thereof from a cross-sectional view thereof. The furnace-side socket comprises a body having a substantially tubular shape, substantially semi-tubular or curved shape or substantially flat shape or any other shape suitable for the purpose of receiving the shank 2 of the radiant pipe TR irrespective of the shape thereof.

Hereinafter, the expression semi-tubular or semi-circular shaped is used to indicate a shape corresponding to half of the pipe of half of the cylinder, but also—depending on the cases—a shape corresponding to a pipe portion or a cylinder portion also different from the half thereof (i.e., for example, a spoon, a cup or other shape suitable for the purpose above).

The body of the socket 3 comprises a first surface 3*a*, suitable—during use—to be constrained and/or to face towards the wall of the furnace to which the socket 3 is constrained.

The body of the socket 3 also comprises a second surface 3*b*, opposite to the first surface 3 *a*.

The shank 2 is suitable to be supported and/or at contact and/or move on at least part of the second surface 3*b*.

Basically, the socket 3 constitutes a sort of a seat for housing and/or receiving the shank 2.

In the version in which the body of the socket 3 has a substantially tubular shape, even the first surface 3*a* and the second surface 3*b* are substantially tubular shaped, wherein the first surface 3*a* has a greater extension than the second surface 3*b*, the latter being internal with respect to the first surface 3*a*. Thus, the first surface 3*a* and the second surface 3*b* are coaxial to each other, in this version of the embodiment, and determine a wall of the body of the socket 3. Such wall has a thickness 3*c*. Thus, the thickness 3*c*, corresponds to the distance between the first surface 3*a* and the second surface 3*b*.

Figure 1B:
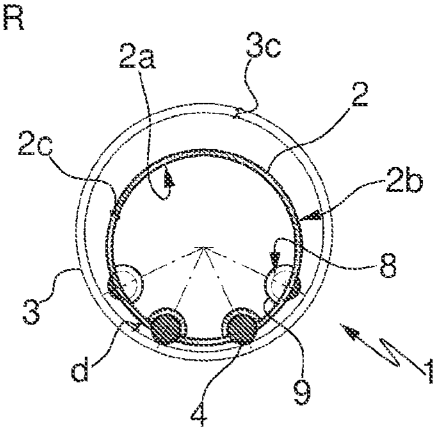
FIG. 1B is a partially sectioned view of the support device for a radiant pipe according to FIG. A.
Figure 2A:
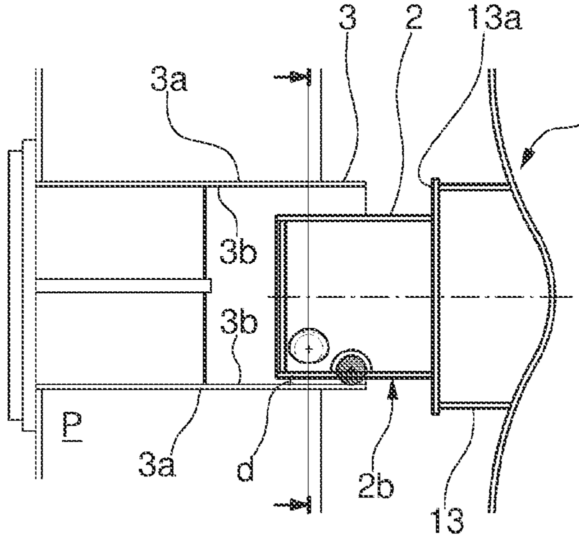
FIG. 2A is a partially sectioned lateral view of an embodiment of a support device for a radiant pipe according to the present invention.
Figure 2B:
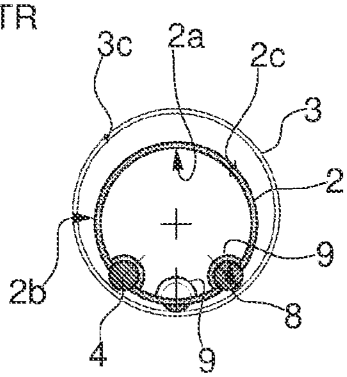
FIG. 2B is a partially sectioned view of the support device for a radiant pipe according to FIG. 2A.

Such version is for example illustrated in FIGS. 1A, 1B. 2A, 2B, 12A, 12B and 13 A, 13B, 16 A, 16B, 17A, 17B and 18A, 18B.

In such version, the body of the socket 3 forms the compartment indicated above inside which the shank 2 is positioned and moves. Furthermore, a part of the second surface 3*b* corresponds to the one usually at contact and/or for support between the socket 3 and shank 2.

In the version in which the body of the socket 3 is substantially semi-tubular or curved shaped, the body of the socket 3 has a first surface 3 *a* and a second surface 3*b* in turn being substantially semi-tubular or curved-shaped or the body of the socket 3 has at least the second surface 3*b* substantially semi-tubular or curved shaped. Even in this case, such surfaces determine a wall of the body of the socket 3 having thickness 3 *c*. In such version, the shape at least of the second surface 3*b* and/or also of the first surface 3*a* and/or of the body of the socket 3, can also be substantially U-shaped.

In this case, the thickness 3*c* may not be constant along the entire surface 3*a*, 3*b*.

In this version, the surfaces 3*a*. 3*b* may be substantially parallel and/or superimposed on each other.

Figure 3A:
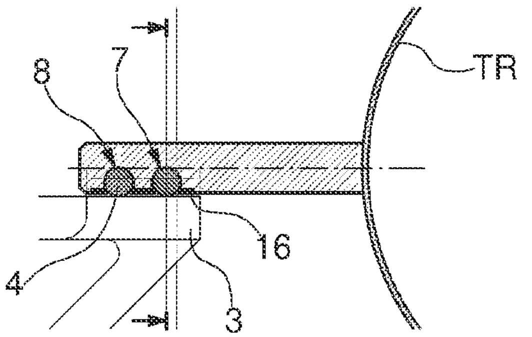
FIG. 3A is a partially sectioned lateral view of an embodiment of a support device for a radiant pipe according to the present invention.
Figure 3B:
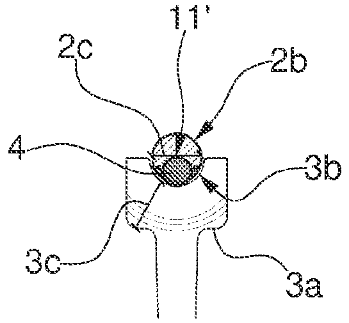
FIG. 3B is a partially sectioned view of the support device for a radiant pipe according to FIG. A.
Figure 4A:
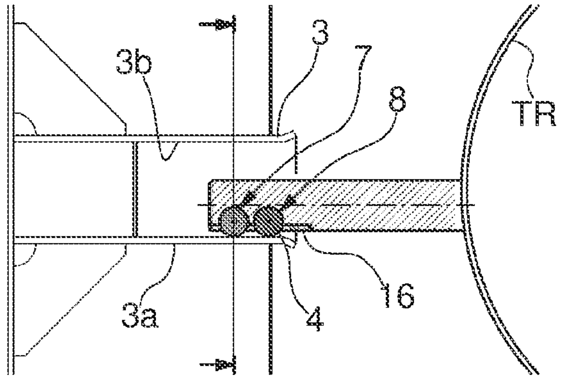
FIG. 4A is a partially sectioned lateral view of an embodiment of a support device for a radiant pipe according to the present invention.
Figure 4B:
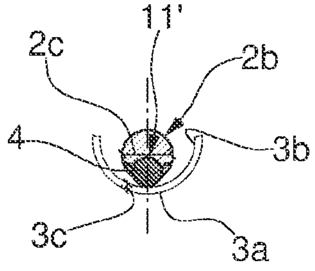
FIG. 4B is a partially sectioned view of the support device for a radiant pipe according to FIG. 4A.

Such version is for example illustrated in FIGS. 3A, 3B. 4A, 4B, 6A. 6B, 14A, 14B.

Lastly, in the version in which the body of the socket 3 is substantially flat shaped, even the first surface 3*a* and/or the second surface 3*b* are substantially flat-shaped, having a thickness 3*c*.

In this version, the surfaces 3*a*. 3*b* may be substantially parallel and superimposed on each other, separated from each other by a thickness.

Figure 5B:
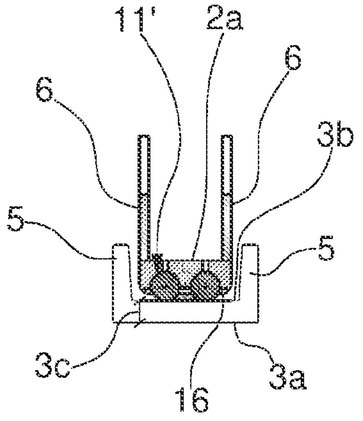
FIG. 5B is a partially sectioned view of the support device for a radiant pipe according to FIG. A.
Figure 8B:
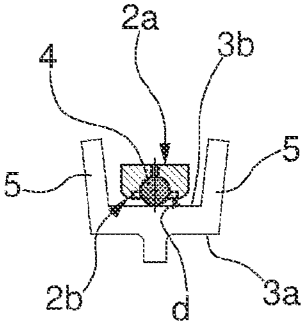
FIG. 8B is a partially sectioned view of the support device for a radiant pipe according to FIG. 8A.
Figure 14A:
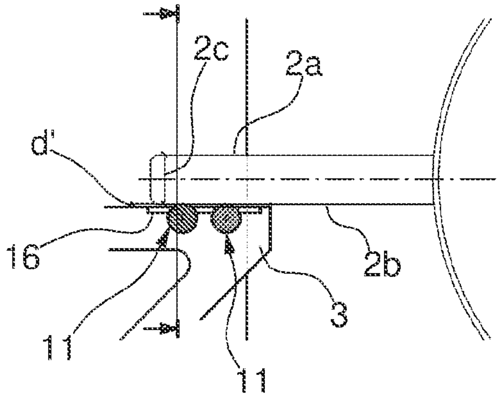
FIG. 14A is a partially sectioned lateral view of an embodiment of a support device for a radiant pipe according to the present invention.
Figure 14B:
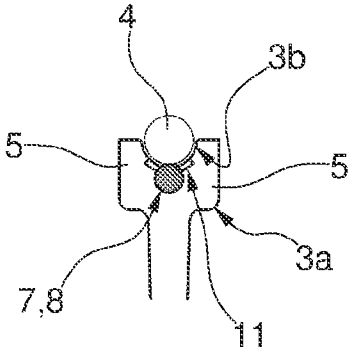
FIG. 14B is a partially sectioned view of the support device for a radiant pipe according to FIG. 14 A.

In this version, according to an embodiment, at least the second surface 3*b*, but possibly also the first surface 3*a*, are substantially U-shaped with sharp edges. Thus, besides the first surface 3*a* and/or the second surface 3*b* which are substantially flat, lateral protrusions 5 (for example visible in FIG. 5B, 8B. 15B) extending from the edges of the body of the socket 3, moving away from the latter, can also be present. Such lateral protrusions 5 (as observable for example in FIG. 14B) can be present also when at least the surface 3*b* is curved.

Such lateral protrusions 5, when present, may have a development substantially perpendicular to that of the second surface 3*b* or they can define, with the latter, an obtuse angle.

In such latter versions, the compartment of the socket 3 consists both of the body of the socket 3 and part of the wall of the furnace. Even in this case, at least one part of the second surface 3*b* corresponds to the zone usually at contact and/or for support between the socket 3 and shank 2.

Figure 7C:
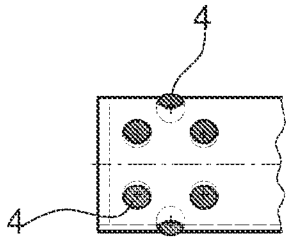
FIG. 7C is a bottom view of a detail of the version according to FIGS. 7A and 7B.
Figure 7B:
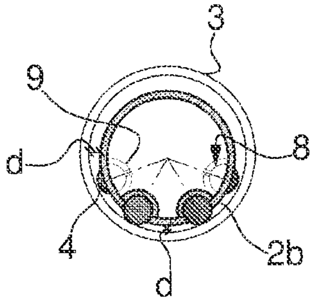
FIG. 7B is a partially sectioned view of the support device for a radiant pipe according to FIG. 7A.
Figure 7A:
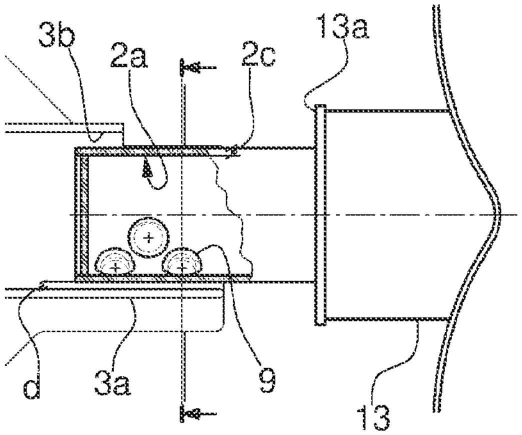
FIG. 7A is a partially sectioned lateral view of an embodiment of a support device for a radiant pipe according to the present invention.

In the version illustrated in FIGS. 7A and 7B, the socket 3 has a substantially tubular shape from which a substantially semi-tubular tab extends towards the radiant pipe TR.

The space between the lateral protrusions 5 and the second surface 3*b*, and/or the space overlying the second surface 3*b*, constitutes a seat for housing, supporting and/or displacing the shank 2 on the socket 3.

The shank 2 determines a (first) longitudinal direction, starting from the radiant pipe TR towards the socket and a transversal direction, perpendicular to the longitudinal direction.

Hereinafter, unless indicated otherwise the expression configuration of the shank 2 shall be used to indicate the shape thereof from a cross-sectional view thereof.

In at least one version, the longitudinal direction determined by the socket 3 is parallel or coincident with respect to the longitudinal direction determined by the shank 2.

The shank 2, in turn comprises a body having substantially tubular or substantially flat shape.

Thus, the body of the shank 2 has an outer surface 2*b*, facing—during use—towards at least part of the second surface 3*b* of the socket 3.

The shank 2 may also comprise an inner surface 2*a*, opposite to the outer surface 2*b*.

In the version in which the body of the shank 2 is substantially tubular-shaped, the outer surface 2*b* and the inner surface 2*a* are also substantially tubular-shaped, hence determining a wall having thickness 2*c*.

Such configuration is for example illustrated in FIGS. 1A, 1B, 2A, 2B. 7A, 7B, 12 A, 12B and 13A, 13B. 17A. 17B, 18A, 18B.

Figure 5A:
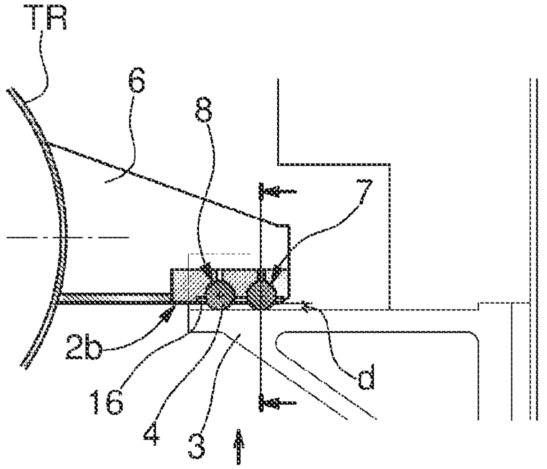
FIG. 5A is a partially sectioned lateral view of an embodiment of a support device for a radiant pipe according to the present invention.

A version, for example illustrated in FIGS. 3A, 3B, 4A, 4B and 14A, 14B, in which the body of the shank 2 is substantially solid or cylindrical tubular-shaped can also be provided for. In this case, an inner surface 2*a*, is not provided for given that the shank 2 is a solid body. In such case, the thickness 2*c* corresponds to the diameter or to the width of the substantially cylindrical body of the shank 2. A further shape of the shank 2 that is semi-circular or semi-cylindrical or U-shaped (the expression semi-circular or semi-cylindrical being used to indicate, in some versions, a part of circle or cylinder even different from the half thereof) can be provided for. Such version is for example illustrated in FIGS. 5A, 5B. 6A. 6B, 8 A, 8B and 15 A, 15B. In such version, the outer surface 2*b* may be substantially semi-circular or curved, and/or with more or less bevelled edges, while the inner surface 2*a* may be curved or substantially flat. In such version, the inner surface 2*a*, and the outer surface 2*b* may be parallel to each other and/or superimposed on each other.

The body of shank 2, alongside all the inner 2*a* and outer 2*b* surfaces thereof determine a wall having a thickness 2*c*. The thickness 2*c* may be constant or not constant along the outer surface 2*b*.

Figure 16B:
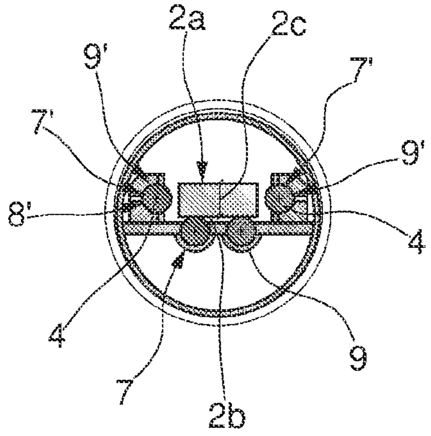
FIG. 16B is a partially sectioned view of the support device for a radiant pipe according to FIG. 16 A.
Figure 16A:
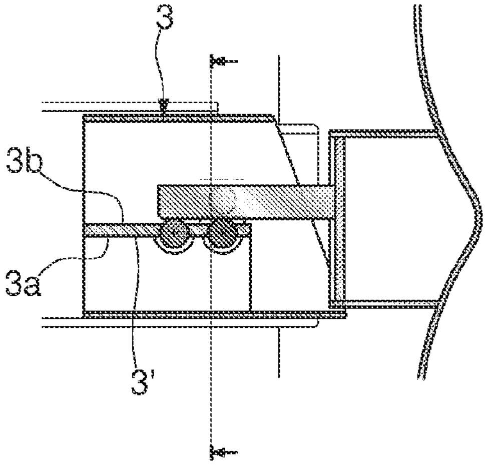
FIG. 16A is a partially sectioned lateral view of an embodiment of a support device for a radiant pipe according to the present invention.

Lastly, in FIGS. 16A, 16B, for example, the body of the shank 2 is substantially flat-shaped, and the inner 2*a* and outer 2*b* surfaces are also substantially flat, separated from each other by a thickness 2*c*. Thus, the inner surface 2*a* and the outer surface 2*b* determine a wall of thickness 2*c*. In such case, the outer surface 2*b* and the inner surface 2*a* are substantially parallel to each other and/or superimposed on each other.

Figure 15B:
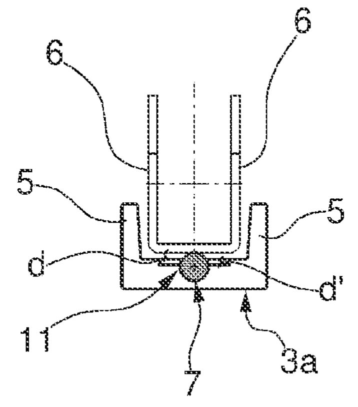
FIG. 15B is a partially sectioned view of the support device for a radiant pipe according to FIG. 15 A.
Figure 15A:
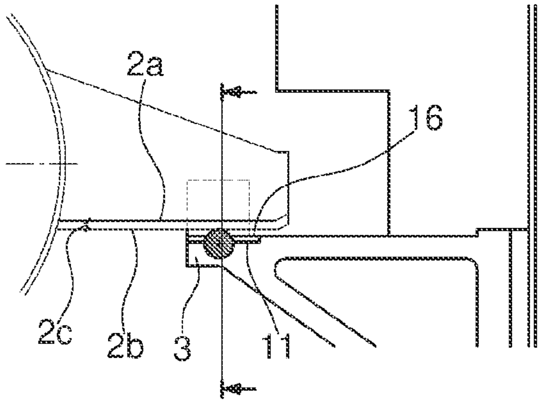
FIG. 15A is a partially sectioned lateral view of an embodiment of a support device for a radiant pipe according to the present invention.

Lateral extensions 6 (for example visible in FIGS. 5B, 6B, and 15B), extending (considering the transversal view thereof) from the edges of the body of the shank 2, moving away from the latter can be present.

Such lateral extensions 6, when present, may have a development substantially perpendicular to that of the outer surface 2*b* and/or of the inner surface 2*a*, or they can define, with one of the latter, an obtuse or acute angle.

Such lateral extensions 6 can also be positioned in other positions of the shank 2, and be suitable—during use—to connect the shank 2 with the radiant pipe TR and/or with a further tubular element 13 that departs from the radiant pipe TR. Considering the longitudinal extension thereof, such lateral extensions 6 connect the shank 2 to the radiant pipe TR and have a substantially trapezoidal or triangular or polygonal longitudinal shape, in which the larger base tends to be positioned at the radiant pipe, or at the curved portion thereof.

In such case, it can be said that the shank 2 is flanged.

As a matter of fact, in some versions, irrespective of the shape of the shank 2 and/or of the socket 3, in order to guarantee greater stability of the support device 1, instead of directly departing from a portion, for example curved, of the radiant pipe TR (illustrated for example in 1 A, 7 A) the shank 2 departs from such further tubular element 13 and/or it is inserted into the latter. Thus, in such version, the further tubular element 13 is fixed and/or welded and/or constrained to the radiant pipe TR (in particular at a curved portion thereof), departing from the latter, while the shank 2 is fixed and/or welded and/or constrained to the further tubular element 13.

In order to have an even greater stability, the shank 2 can be at least partly inserted into the further tubular element 13 and fixed and/or welded and/or constrained also to the inner wall of the latter, as well as to the end 13*a* thereof—during use—facing towards the socket 3.

Still in a further version, both the shank 2 and the further tubular element 13 can be fixed and/or welded and/or constrained to the radiant pipe TR, besides to each other.

Thus, the support device 1 comprises a single shank 2 (i.e. directly welded onto the curved portion of the radiant pipe or on a surface of the radiant pipe) or with two shanks (or double shanks), determined by the actual shank 2 and by the further tubular element 13.

The further tubular element 13 has a diameter suitable to house the shank 2 and it also has an extension such not to interfere with the socket 3.

In this and in the other versions of the present invention, one or more stiffening elements (not illustrated) such as for example reinforcement flanges, crosspieces, sheet plates, discs, other structures having a special shape, etcetera, arranged inside the shank 2 (given that the latter is hollow) or arranged connected between the shank 2 and/or radiant pipe TR and/or further tubular element 13, possibly with particular reference to the curved portioned of the radiant pipe can also be present.

Such stiffening elements can be longitudinal-shaped for example trapezoidal, triangular or polygonal-shaped in general.

These further structures (further tubular element 13 and/or one or more stiffening elements) help to optimally distribute the weights and the stresses to which the support device is subjected 1 on a greater area with respect to the one that would determine the shank 2 directly constrained to the radiant pipe, thus obtaining lesser stress on the radiant pipe and better results in terms of preventing the jamming and/or the sticking of the shank 2 on the socket 3.

Even in this case, the stiffening elements are configured so as not to interfere with the socket 3.

Such stiffening elements can for example be one of more sheets made of material resistant to high temperatures positioned in the tubular shanks, for example so as to be positioned in a cross-like manner.

Additionally, or alternatively, such stiffening elements, for example in form of triangular, trapezoidal or polygonal flanges can depart from the outer surface 2*b* of the shank 2 (for example from the apical position thereof) with the aim of connecting the shank 2 to the further tubular element 13 and/or to the radiant pipe TR.

In such case, more than one of such flanges, for example two or three or four, can also be arranged radially substantially with respect to the centre of the circular transversal configuration of the shank 2 (irrespective of whether solid or hollow).

In a version of the invention, the lateral extensions 6 can also be considered stiffening elements or they can have stiffening elements between them.

Still for stiffening purposes, the shanks 2 with circular section can be flanged to the end, for example the one facing towards the socket 3 during use.

In some versions, when the further tubular element 13 is present, the stiffening elements can also be present therein (and/or outside) or, when present on the shank 2, also continue into (and/or outside) the further tubular element 13.

In FIGS. 1A, 7A indicated, as mentioned, the shank 2 and socket 3 have a circular section and are tubular-shaped (but, as mentioned, with the possibility of having the further tubular element 13 despite the shank 2 and socket 3 having a different shape with respect to the circular one).

FIGS. 3 and 4 illustrate a support device 1, for radiant pipes shaped in any manner, which have a shank 2 formed by a solid cylindrical element (i.e. a round rod) whose diameter may vary depending on the needs. According to an example, such diameter may be equal to or greater than 20 mm in size. Even in this case, though not illustrated, a further tubular element 13 could be provided for the purposes outlined above.

In such version, besides an at least one rotary means 4, at least one edge or containment element 16 suitable to hold the at least one rotary means 4 in position during use is present. Such edge or containment element 16 can be welded and/or directly constrained on the surface 2*b* of the shank 2 with the aim of, during use, holding the at least one rotary means 4 in position and simultaneously allowing the rotation and the purposes illustrated above.

Figure 6A:
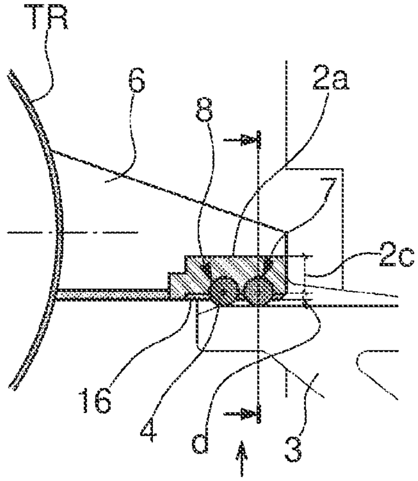
FIG. 6A is a partially sectioned lateral view of an embodiment of a support device for a radiant pipe according to the present invention.
Figure 6B:
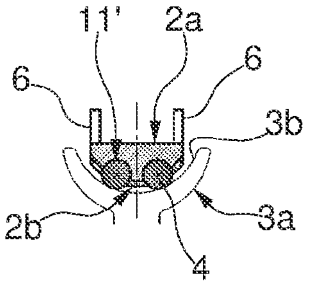
FIG. 6B is a partially sectioned view of the support device for a radiant pipe according to FIG. 6A.

FIGS. 5 and 6 illustrate a support device 1, for radiant pipes of any shape, having a flat-shaped or U-shaped shank 2, as mentioned. Even in this case, one or more edges or containment elements 16 having the characteristics described above are present.

In this version, the socket 3 is flat or U-shaped.

Figure 8A:
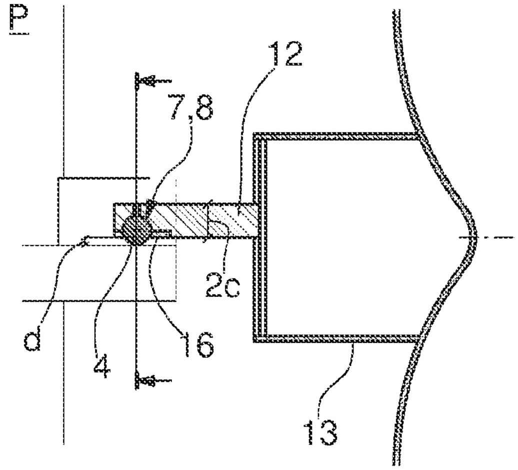
FIG. 8A is a partially sectioned lateral view of an embodiment of a support device for a radiant pipe according to the present invention.

FIG. 8 illustrates a support device 1, for radiant pipes of any shape, comprising a shank formed by an extension or "spout" 12 having a circular or curved base (corresponding to the outer surface 2*b* of the shank), in turn extending from a tubular element 13 constrained to the radiant pipe TR. Such shank 2 can be received by a socket 3 of any shape. For example, the image displays a socket 3 protruding from the wall P of the furnace, in the direction of the radiant pipe TR, and it is substantially U-shaped.

The at least one rotary means 4 is positioned in the extension or "spout" 12, and/or on the circular or curved base thereof by means of one or more edges or containment elements 16.

Figure 9:
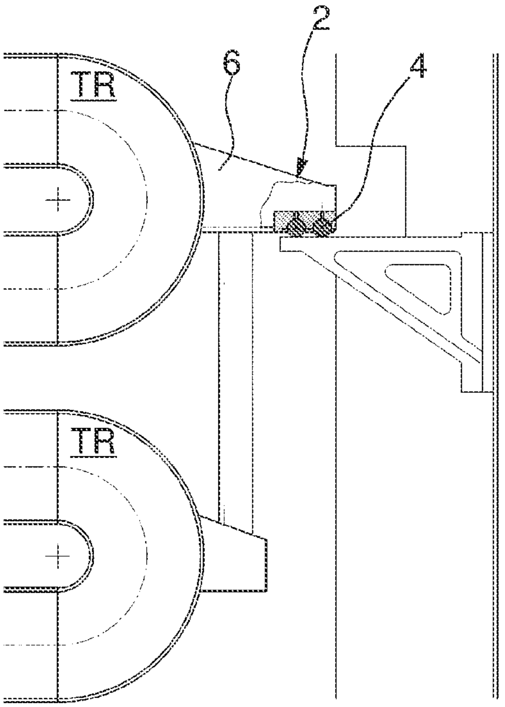
FIGS. 9 and 10A are partially sectioned lateral views of a support device for a radiant pipe according to the present invention in which the radiant pipe is double U or double W-shaped.
Figure 10A:
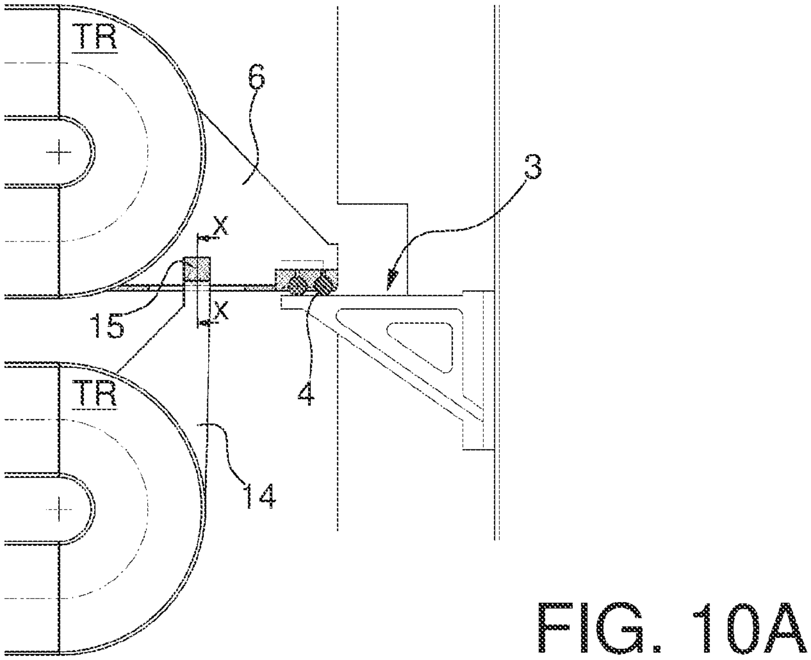
Figure 10B:
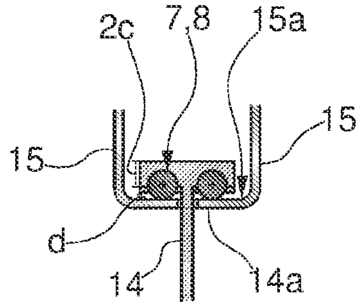
FIG. 10B is a section of a detail of FIG. 10A taken along the line of plane X-X.
Figure 12A:
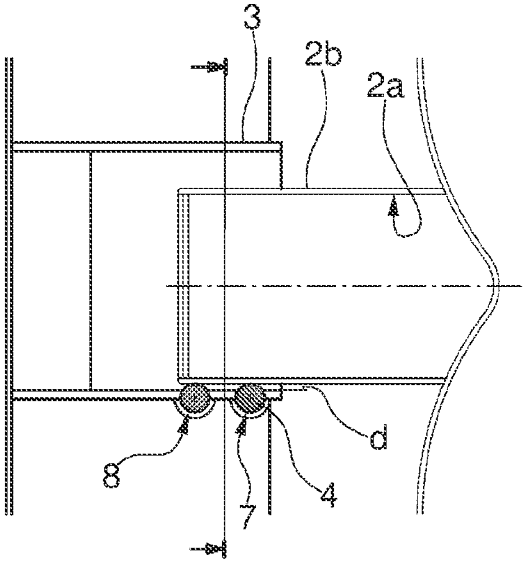
FIG. 12A is a partially sectioned lateral view of an embodiment of a support device for a radiant pipe according to the present invention.
Figure 12B:
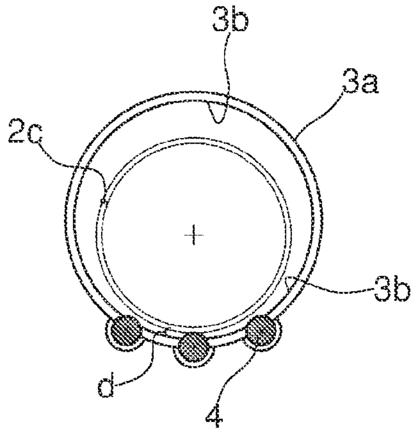
FIG. 12B is a partially sectioned view of the support device for a radiant pipe according to FIG. 12 A.
Figure 11A:
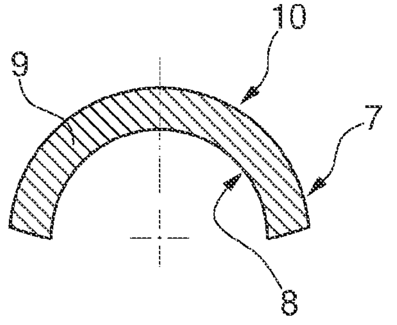
FIGS. 11A to 11F are cross-sectional views of an element of support device for a radiant pipe according to the present invention.
Figure 11B:
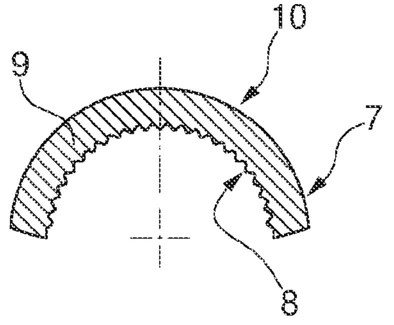
Figure 11C:
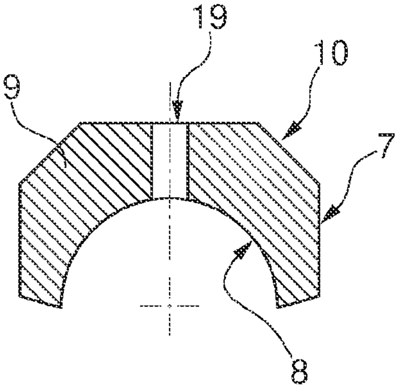
Figure 11D:
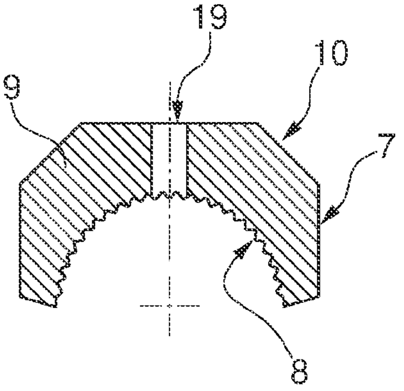
Figure 11E:
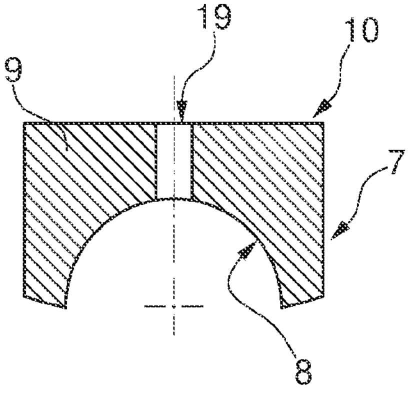
Figure 11F:
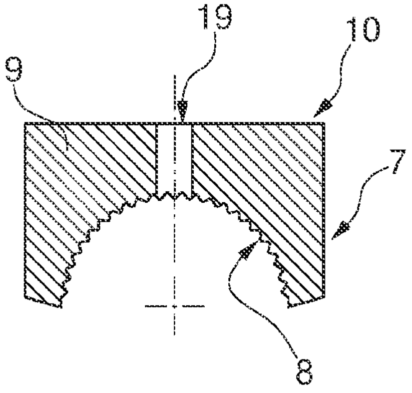

FIGS. 9 and 10A illustrate the support device 1, for a radiant pipe of any shape, wherein the rotary means 4 is inserted into a generally flat or U-shaped shank 2. In FIG. 10 A, irrespective of the shape of the shank 2 and socket 3, a curve of the radiant pipe (for example the underlying curve) is engaged to another curve of the radiant pipe (for example the upper one) by means of a first T-shaped connection structure 14. (as visible in FIG. 10B) or of another shape, which is inserted into a second U-shaped upper bearing structure 15 or a bearing structure of another shape. As better observable in FIG. 10B, inserted into the first T-shaped structure 14 and/or second U-shaped structure 15 is at least one rotary means 4 with the aim of preventing direct contact between the two structures and thus preventing blocking and/or friction and/or sticking phenomena between them.

In a version of the invention, the second structure 15 may be part of the shank 2. The at least one rotary means 4 may for example be positioned in the lower face 14*a* of the T-shaped element of the first T-shaped structure 14 and/or of the upper face 15*a* of the base of the U-shaped element of the second U-shaped structure 15. FIGS. 12, 14, 15 and 18 illustrate the support device 1, for a radiant pipe of any shape, wherein the at least one rotary means 4 is directly inserted into the socket 3 (of any shape), in particular on the second surface 3*b* thereof, thus allowing to receive the shank 2 (of any shape) which thus slides above the at least one rotary means 4, the latter rotating during and due to the extension of the shank 2 itself. The at least one rotary means 4 is inserted in any point that would usually be of contact between the socket 3 and the shank 2: i.e. at the vertical pressure points of the shank 2 on the socket 3 and/or in possible pressure points and/or lateral contact of the shank 2 on the socket 3. Thus, the at least one rotary means 4 can be installed in the containment walls of the socket 3, preventing any possible friction and/or sticking (even lateral) between the parts in question.

Figure 18A:
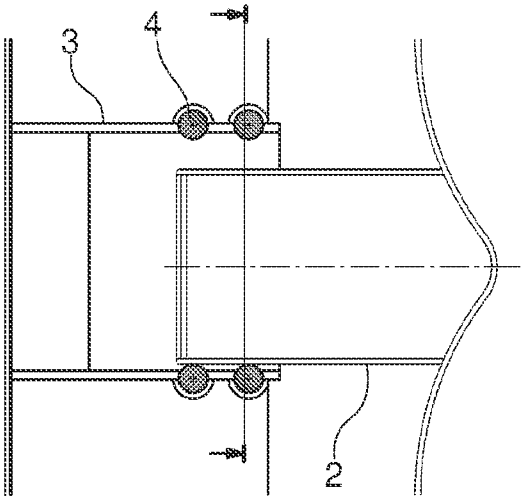
FIG. 18A is a partially sectioned lateral view of an embodiment of a support device for a radiant pipe according to the present invention.
Figure 18B:
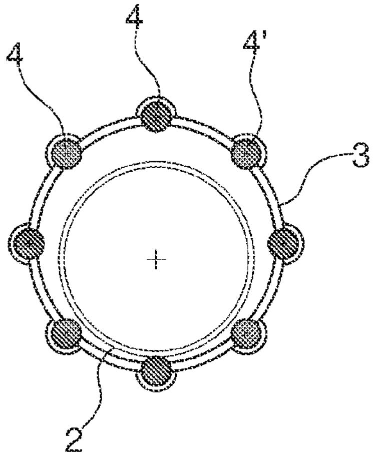
FIG. 18B is a partially sectioned view of the support device for a radiant pipe according to FIG. 18 A.
Figure 19A:
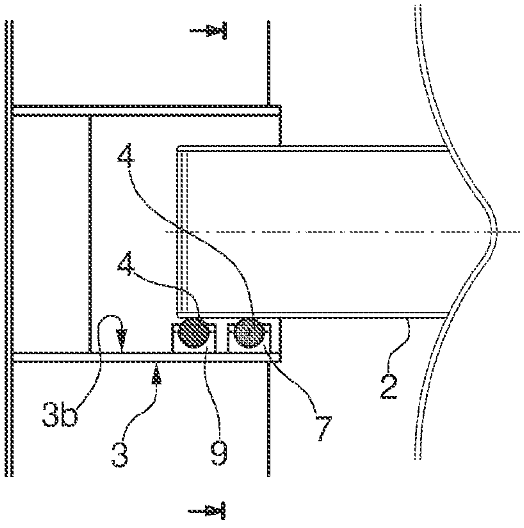
FIG. 19A is a partially sectioned lateral view of an embodiment of a support device for a radiant pipe according to the present invention.
Figure 19B:
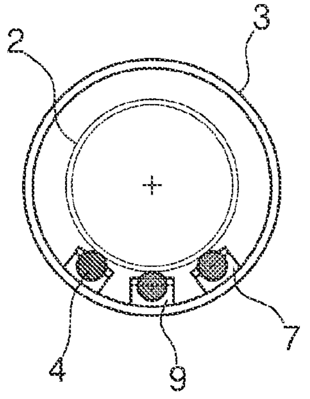
FIG. 19B is a partially sectioned view of the support device for a radiant pipe according to FIG. 19 A.
Figure 20A:
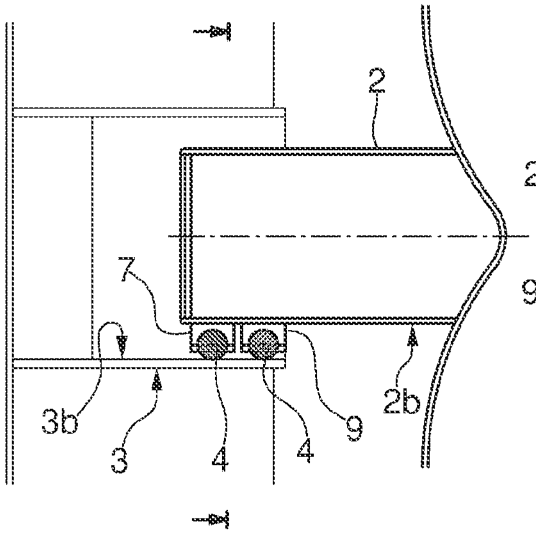
FIG. 20A is a partially sectioned lateral view of an embodiment of a support device for a radiant pipe according to the present invention.
Figure 20B:
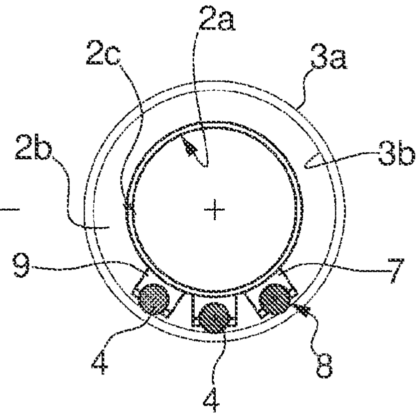
FIG. 20B is a partially sectioned view of the support device for a radiant pipe according to FIG. 20A.

In particular, in FIG. 18, the at least one rotary means 4 is positioned on all the surfaces of the socket 3 facing towards the shank 2 so as to obtain an optimal result.

Figure 17A:
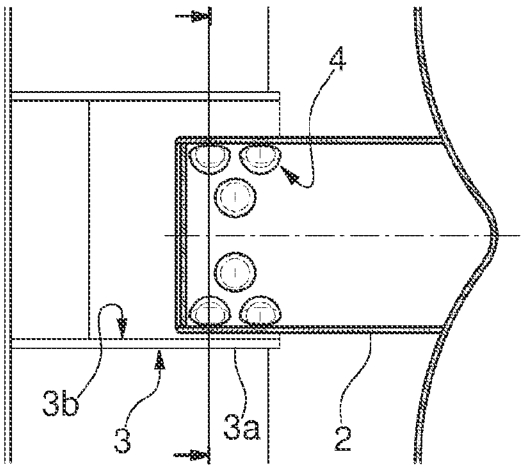
FIG. 17A is a partially sectioned lateral view of an embodiment of a support device for a radiant pipe according to the present invention.
Figure 17B:
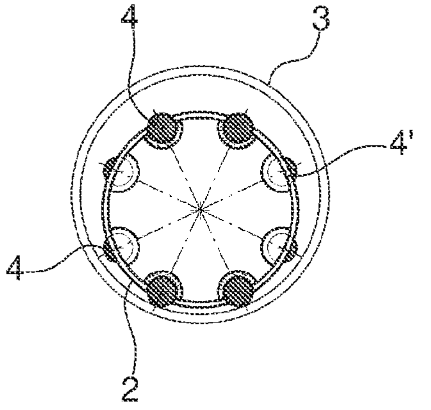
FIG. 17B is a partially sectioned view of the support device for a radiant pipe according to FIG. 17 A.

FIGS. 17 and 18 illustrate round or circular shanks 2 with the aim of allowing the installation of the radiant pipes in any position desired by the user. Particularly, this concept is useful for horizontal furnaces where radiant pipes are generally installed both on the lower part and on the upper part (in which the pipe is arranged in the opposite direction with respect to the lower one and it is rotated by 180°) of the furnaces (the sheet web to be treated passes therebetween). When replacing existing pipes, the customer may not be sure of the radiant pipe to be replaced in advance given that this can be verified only once the furnace has been turned off. Given that the at least one rotary means 4 is inserted on the entire circular surface of the shanks 2 and/or of the sockets 3, the direction of installation does not matter given that natural contact between the rotary means installed on the shanks 2 and the socket 3 and/or between the shanks 2 and the rotary means 4 installed on the sockets 3 is obtained in any case.

In particular, in FIG. 17, the at least one rotary means 4 is positioned on the entire surface of the shank 2 facing towards the socket 3 so as to obtain an optimal result. More in detail, there are a plurality of rotary means 4 positioned, possibly in an alternating fashion, on the surface of the shank 2 facing towards the socket 3.

In some cases, as mentioned, the pipes—depending on the direction of installation in the furnace—are rotated by 180° and this rotation changes the direction according to which the shank rests on the sockets. Thus, in some versions, the rotary means 4 are installed, possibly in an alternating fashion, at 360° on the shank 2, so that the pipe can be mounted according to any orientation.

As a matter of fact, the pipes with the at least one rotary means 4 installed only on one part of the shank 2 (for example as represented in FIGS. 1 A, 2 A and 7 A) have an orientation and can be suitable—in this type of furnaces—for installation solely in the lower part or solely in the upper part.

Figure 13A:
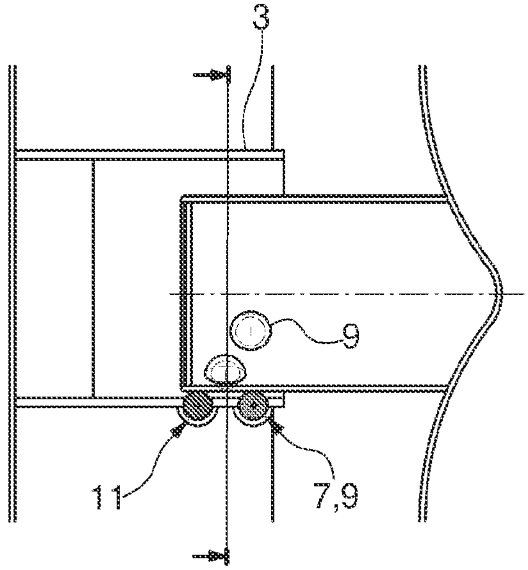
FIG. 13 A is a partially sectioned lateral view of an embodiment of a support device for a radiant pipe according to the present invention.
FIG. 13B is a partially sectioned view of the support device for a radiant pipe according to FIG. 13 A.
Figure 13B:
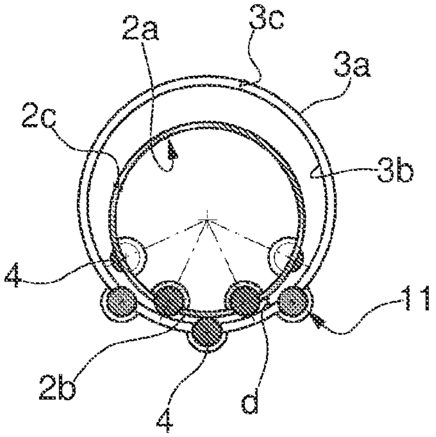

FIGS. 13 A and 13B illustrate the support device 1, for a radiant pipe of any shape, wherein the rotary means 4 is inserted both on the shank 2 (of any shape) and on the socket 3 (of any shape), in particular both on the second surface 3*b* of the shank 3 and on the outer surface 2*b* of the shank 2.

The positioning of the at least one rotary means when several rotary means 4 are positioned, is carried out following a non-axial development so as to prevent the superimposition of the rotary means 4 on each other. Thus, there is a multiple rolling friction between the shank 2 and socket 3 by means of the rotary means 4. Furthermore, when using such solution, the shank 2 is "guided", there is some sort of "guide" provided by the position of the rotary means 4, in that the shank 2 can usually be directed to the right or to the left during the extension of the radiant pipe. This solution is particularly effective should the socket 3 be without lateral containment walls, thus preventing the shank 2 from exiting from its seat.

Lastly, FIG. 16 illustrates the support device 1, for a radiant pipe of any shape, wherein the socket 3 (having a substantially circular section and being substantially tubular-shaped or a similar structure) comprises a flat base 3' positioned therein, for example in median position with respect thereto.

Such flat base 3' serves as a support for the shank 2.

Such flat base 3' comprises at least one rotary means 4, which is inserted into said flat base 3' (i.e. at least into the thickness of the flat base 3') and/or laterally with respect thereto.

In such case, the first surface 3*a* and the second surface 3*b* can also be identified on the flat base 3'.

In this figure (and in the others in which the at least one rotary means is positioned laterally with respect to the shank 2) the at least one rotary means 4' arranged laterally to the shank 2 serves as a lateral centring pin, thus preventing any direct contact between the shank 2 and socket 3.

As regards the at least one rotary means 4, it comprises a spheroid element or a spherical element or a substantially spherical element. Thus, the at least one rotary means 4 comprises a sphere, a ball, a wheel or a marble; the dimensions and the number of the at least one rotary element 4 depend on the dimensions and on the shape of the shank 2 and/or of the socket 3.

According to a version of the invention, the at least one rotary means 4 may rotate by 360 degrees around a central point thereof.

According to a further version, the at least one rotary means 4 may rotate around an axis passing through the centre thereof.

The advantage attained by the at least one rotary means 4 lies in "transforming" a sliding friction (i.e. the friction generated due to the sliding/extension of the radiant pipe TR and/or the shank 2 thereof on the socket 3 due to the expansion thereof caused by the high operating temperatures and/or due to the oscillations caused by the vibrations generated by the burner to which the radiant pipe is connected and/or due to the operation thereof) into a rolling friction, generated by the presence of the at least one rotary means 4. The expression rolling friction is used to indicate a friction which occurs in the motion of a body moving on another body without sliding but rather rolling, hence continuously changing the contact surface. This is what occurs in the at least one rotary means 4 during the operation thereof at high temperature, as it will be better clarified hereinafter. Basically, during the expansion and/or the oscillation of the radiant pipe TR, which occurs during the use thereof, a rolling friction is generated with respect to the socket 3, due to the at least one rotary means 4, which rolls when the radiant pipe TR moves and/or slides.

At the same time, the at least one rotary means 4 represents the point of contact between the shank 2 and the socket 3, connecting such two components of the support device 1 for a radiant pipe TR according to the present invention.

In particular, the present invention allows, as mentioned, to eliminate the direct contact between the shank 2 and the socket 3 and limit the contact per se to single resting points (or small areas), corresponding to resting points (or small areas) of the at least one rotary means 4 on the shank 2 and/or socket 3. Such point or small contact area approximately measures about a few millimetres.

In a version of the invention, the at least one rotary means 4 is at least partially inserted into the wall of the body of the shank 2 and/or it is at least partially inserted into the thickness 2*c* of the shank 2.

In a further version, the at least one rotary means 4 is at least partially inserted into the wall of the body of the socket 3 and/or it is at least partially inserted into the thickness 3*c* of the socket 3.

In a still another version, the at least one rotary means 4 is inserted into the wall of the body of the shank 2 and/or it is inserted into the thickness 2*c* of the shank 2 and into the wall of the body of the socket 3 and/or it is inserted into the thickness 3 *c* of the socket 3.

In the latter version, the at least one rotary means 4 is installed asymmetrically so as to prevent the contact of a rotary element 4 on another rotary element 4. As mentioned, this allows guaranteeing a sliding "guide" of the shank 2 in the socket 3 or on the socket 3.

Furthermore, the at least one rotary means 4 projects from the outer surface 2*b* of the shank 2 and/or from the second surface 3*b* of the socket 3 by a distance d.

Thus, this allows preventing the shank 2 and the socket 3 from being at direct contact with each other. As a matter of fact, they are at contact only by means of the at least one rotary means 4.

By so doing, the material of the socket 3 and that of the shank 2 (which are similar) do not stick onto each other (an effect observed when two components are at direct contact on each other) and this also allows preventing the formation of friction between them (caused by the movement of the shank on the socket) and the ensuing stress which—as mentioned above—leads to deformation and ultimately to the collapse of the radiant pipe TR.

FIGS. 19A to 20B illustrate further examples of the present invention, in which both the shank 2 and the socket 3 are substantially tubular-shaped with circular section. However, this version could also be applied to shanks 2 and/or sockets 3 of different shapes.

The at least one rotary means 4, inserted into the seat 7 and/or into the insert 9, faces towards the other, between the shank 2 and the socket 3, with respect to the element (shank 2 or socket 3) in which the respective seat 7 and/or the respective insert 9 is obtained.

As a matter of fact, in this case, the insert 9 is fixed and/or welded and/or applied onto the outer surface 2*b* of the shank 2 and/or onto the second surface 3*b* of the socket 3, for example by means of a second area 10 of the insert. Thus, the opening present in the seat 7 and/or in the insert 9 from which the at least one rotary means 4 projects and/or protrudes is opposite to the second zone 10, the latter being at contact and/or fixed and/or applied on the shank and/or socket.

Thus, the seat 7 and/or the insert 9 and/or at least one rotary means 4—in this version—are actually positioned in the socket 3 and/or outside the shank 2, i.e. for example in the space comprised and/or interposed between the shank 2 and socket 3, should the latter two be tubular-shaped.

In this case, the insert 9 (for example is made of rolled steel) can be welded on the second surface 3*b* of the socket 3 and/or on the outer surface 2*b* of the shank 2; the insert 9 can alternatively be forged/centrifuged (if for example made of forged or cast material).

The at least one rotary means 4, in a version of the invention, is made of composite material. The thermal dilation of the at least one rotary means may vary between 0 mm (and thus be null) and about 5 cm, or between 0 and 5 mm or between 0 and 15 mm depending on the dimensions of the material used.

The composite material of the at least one rotary means 4 has a resistance to vertical stress (i.e. the weight to be borne) up to or beyond 20 tons per inch or 20 tons per 2.54 cm, and/or a resistance to temperature beyond 1300° C. (from about 400° C. up to a peak of 2000° C. or beyond) and/or a hardness comprised between 20 HRC and 70 HRC or beyond (up to a maximum of about 75/80 HRC). The measurement of the hardness is according to the Rockwell scale and it is conducted by means of a HRC scale, according to which the penetrating means is a diamond cone with an opening angle equivalent to 120° and connection radius of 0.2 mm. This method is preferably used for very hard materials with Brinell HB hardness value up to 200 or greater than 200.

These resistance parameters of the at least one rotary means 4 guarantee, in at least one version of the invention, the use thereof on any type of radiant pipe (made of sheet, cast/molten/centrifuged, with silicon carbide, comprising materials made of iron, chromium, aluminium, such as those known by the trade name Kanthal APM and APMT or another name), of any weight (between 5 kg to more than 1000 kg) and, above all, the scaling thereof even in case of default arising from any type of event on the pipe and/or on the shank/socket, such as deformations or other. As a matter of fact, such hardness is considerably greater than any other material used for manufacturing radiant pipes and/or shanks and/or sockets, so that the at least one rotary means is capable—even in the absence of rolling friction—of resisting against extraordinary pressure, loads and/or temperatures without being damaged.

Furthermore, the material used for such solution was selected from among materials that prevent any kind of sticking both between the socket and the shank of the radiant pipe and above all even between them and the materials of the elements (socket and shanks) where they can be applied. Only the operation of the system according to these technical features allows to guarantee the transformation of a sliding friction into a rolling friction. As a matter of fact, the previous inventions could never guarantee a functional but only a theoretical rolling friction due to the lack of all technical aspects and the appropriate materials present in the invention in question suitable to allow such physical aspect.

To confirm the above, in at least one version of the invention, the at least one rotary means is not made of steel or steely material or exclusively ceramic material. This is due to the fact that steel or steely material has a coefficient of thermal expansion and/or a coefficient of resistance not compatible with the operation thereof; the exclusively ceramic material would be too fragile, with respect to the weight that such at least one rotary means 4 is required to bear. According to a further version, the at least one rotary means 4 can be made of an anti-friction material, such as for example a ferrous or non-ferrous material for example comprising nickel, and/or containing ceramic particles such as zirconium, silica, nitrides, alumina or other materials suitable to prevent the sticking with the shank and/or socket and/or silica nitride, possibly subjected to at least one treatment, for example the one known by the trade name of Cerbec, or other similar treatments or without treatments, with the aim of making the at least one rotary means 4 visibly polished, and/or smooth and/or anti-scratch, etc.

In order to guarantee the operation of the device 1 at temperatures up to 1300° C. and beyond, special attention was paid to studying the extension differences of the materials used for each of the components. This allowed to find the appropriate measurement regarding the space (or gap) that should be kept between the at least one rotary means 4 and a housing seat 7 thereof.

This allows guaranteeing all the advantages offered by the present invention, relating to the fact that at least one rotary means 4 is fixed and/or installed (at least partially) in the wall and/or in the thickness of the shank 2 and/or of the socket 3, and simultaneously free to rotate by 360°. This allows to always guarantee a rolling friction between the shank 2 and the socket 3. As a matter of fact, between the at least one rotary means 4 and the seat 7 in which it is inserted tolerances (even minimal, in the order of decimals) are guaranteed so as to allow the rolling friction.

On the contrary, were this space between the rotary means 4 and the seat 7 not to be guaranteed, during the heating of the materials forming the device 1, some of the latter (for example those with greater extension and/or expansion) could "close" and/or occupy such space, eliminating the rolling friction hence determining the blocking of the system.

Similarly, as concerns given materials, the at least one rotary means 4 may be "blocked" in the seat 7 thereof while cold. Then, upon reaching a given temperature suitable to extend and/or expand one of the materials involved (for example the "softest" material among those involved) at a higher rate than that of the at least one rotary means 4, the space that allows the rotation of the at least one rotation is created (hence the rolling friction is guaranteed).

Given that the at least one rotary means is at least partially inserted into the wall of the body of the shank 2 and/or into the thickness 2*c* of the shank 2 and/or into the wall of the body of the socket 3 and/or into the thickness 3*c* of the socket 3, such at least one seat 7 for housing the at least one rotary means 4 is present in such walls and/or thickness.

Thus, such at least one seat 7 is obtained in the wall of the body of the shank 2 and/or in the thickness 2*c* of the shank 2 and/or in the wall of the body of the socket 3 and/or in the thickness 3*c* of the socket 3.

Such at least one seat 7 allows to fix but not block the at least one rotary means 4 in the shank 2 and/or in the socket 3. This allows preventing the possibility of the inadvertent release, loss and/or removal of the at least one rotary means 4.

Furthermore, each rotary means 4 has a housing seat 7 thereof.

The at least one seat 7 constitutes a sort of "plug" or "cap" with an innovative design that follows the shape of the at least one rotary means 4 and allows the rolling and/or rotation thereof during the "thrust" step of the radiant pipe TR (i.e. during the extension step), while simultaneously bearing the weight thereof.

The shape of the at least one seat 7 also depends on the specific shape of the shank 2 and/or of the socket 3 in which it is obtained.

However, the shape of the housing seat 7 generally corresponds to that of the rotary means 4, with slightly greater dimensions with respect to the latter.

The at least one rotary means 4 may have a diameter comprised between 0.1 cm and 10 cm or 12.5 cm, preferably between 0.1 cm and 6 cm, even more preferably between 1 cm and 4 cm, or further between 1 cm and 2 cm or it measures about 1.2 cm. Such measurement depends on the size of the shank 2 and/or of the socket 3 and/or of the radiant pipe TR. What matters is that the dimensions of the rotary means 4 allow to prevent contact between the shank 2 and the socket 3.

The at least one seat 7 may be directly obtained in the wall of the shank 2 and/or of the socket 3 and/or of the thickness 2*c* and/or of the thickness 3*c*.

Alternatively, the at least one seat 7 may be obtained by means of an insert 9 in turn partly inserted into the wall of the shank 2 and/or of the socket 3 and/or of the thickness 2*c* and/or of the thickness 3*c*.

Should such insert 9 be present, it is made of steely and/or cold rolled and/or hot rolled material, obtained by diffusion and/or forging, and/or a composite material and/or a ceramic material and/or a material resistant to high temperatures and/or made of a materials among those listed above for the radiant pipe TR. In at least one version of the invention, the material constituting the insert 9 and/or the seat 7 has a coefficient of thermal expansion corresponding to that of the shank 2 and/or of the socket 3 into which it is inserted.

The dimensions and shape of the at least one seat 7 (and/or of the insert 9 thereof) are suitable to at least partially house the at least one rotary means 4, and fix it in position and, simultaneously, to allow the rolling and/or the rotation thereof.

The shape of the at least one seat 7 and/or of the insert 9 thereof also depends on the shape of the shank 2 and/or of the socket 3 into which it is inserted.

More in detail, the at least one seat 7 comprises a first zone or cavity 8.

Such first zone or cavity 8 has a shape substantially corresponding to that of the at least one rotary means 4.

Thus, should the at least one rotary means 4 be shaped like a sphere, ball or marble, the first zone or cavity 8 has a substantially spherical cap-shaped surface. The spherical cap has dimensions and/or shape of at least one hemisphere. I.e, the spherical cap has dimensions and/shape corresponding to that of a hemisphere or larger than a hemisphere. Furthermore, the at least one seat 7 and/or the first zone or cavity 8 thereof must have dimensions slightly larger than those of the at least one rotary means 4. In this manner, the latter is held in the at least one seat 7 and/or in the first zone or cavity 8 thereof but it is simultaneously free to rotate so as to carry out the function thereof.

Such first zone or cavity 8 and/or such at least one seat 7 is delimited by a circular opening. Such circular opening is present at the outer surface 2*b* and/or the second surface 3*b* respectively of the shank 2 and of the socket 3.

For example, according to at least one version of the present invention, the at least one rotary means 4 is inserted into the seat 7 and/or into the zone or cavity 8 for about half (or slightly more) of the volume thereof (or of the diameter thereof for example considering the section of a sphere, a ball or a marble)—and thus in the wall of the shank 2 and/or socket 3—and, slightly more than half, outside the shank 2 and/or the socket 3. Thus, the circular opening will have a section smaller than that at the equatorial plane of the at least one rotary means 4 and/or a diameter smaller than that of the at least one rotary means 4.

The distance d corresponds to the sectional size of the diameter of the at least one rotary means 4 minus the portion that remains inside the seat 7.

In a version of the present invention, the at least one seat 7 has a first zone or cavity 8 shaped with curved sections or flat sections, each flat section being possibly inclined with respect to the adjacent sections (curved and/or flat), so as to create a space capable of holding at least one rotary means 4 therein and simultaneously allowing the rotation thereof so as to carry out the function thereof.

In a version of the present invention, the at least one seat 7 has a first zone or cavity 8 with curved shapes or curved sections, so as to create a space capable of holding at least one rotary means 4 therein and simultaneously allowing the rotation thereof so as to carry out the function thereof.

The first cavity or zone 8 may have a smooth surface (preferably) or having a roughness and/or knurling more of less accentuated depending on the needs.

Such at least one seat 7, as mentioned, may be obtained inside the shank 2 and/or the socket 3 and thus the outer surface 2*b* thereof and/or second surface 3*b* has one or more recesses determined by such at least one seat 7.

In the version in which at least one seat 7 is obtained by means of an insert 9 inserted into the wall of the shank 2 and/or of the socket 3 and/or of the thickness 2*c* and/or of the thickness 3*c*, the first zone or cavity 8 is obtained in the insert 9.

The first zone or cavity 8 is in any case faced to the other between the shank 2 or socket 3 with respect to the component (shank 2 and/or socket 3) on which it is obtained. Thus, the at least one rotary means 4 directly (and/or always) faces the other between the shank 2 or socket 3 with respect to the component (shank 2 and/or socket 3) on which it is positioned. Furthermore, the at least one rotary means is positioned at least at the one that—without rotary means—would the contact or possible contact surface between the shank and socket.

Such insert 9 is for example illustrated in FIGS. 1A, 1B, 2A, 2B, 7A, 7B, 13A, 13B, 17 A, 17B and 18A. 18B, as well as from 11A to 11F.

The insert 9 is thus an independent element with respect to the shank 2 and/or socket 3 and it is inserted and/or applied and/or connected and/or fixed and/installed on the shank 2 and/or socket 3.

As previously mentioned, the first zone or cavity 8 may be shaped as a spherical cap or different shape.

Furthermore, besides the first zone or cavity 8, the insert 9 also comprises a second zone 10, opposite to the first zone or cavity 8 and to the circular opening from which at least one rotary means 4 extends.

Such second zone 10 is curved or convex-shaped.

In a version of the invention, the second zone 10 has a shape with curved sections and/or flat sections, each flat section being possibly inclined with respect to the adjacent curved and/or flat sections, so as to create a space capable of holding at least one rotary means 4, 4' therein and simultaneously allowing the rotation thereof. In a preferred version of the invention, the second zone 10 has a shape with substantially flat sections, each substantially flat section being inclined with respect to the adjacent substantially flat sections.

The insert 9 has a solid geometric overall shape, for example cylindrical, conical, polyhedral, prismatic, truncated cone or truncated pyramid, spherical, spherical segment, etcetera.

Generally, the seat 7 and/or the insert 9, required to safely hold the rotary means 4 therein, for example in form of spheres, can be shaped as illustrated in FIGS. 11A, 11B, 1C, 11D, 11E, 11F or any other geometric shape (even depending on the adaptation to be followed depending on the shape of the socket and shanks elements in question whenever required) needed to attain the objective, i.e. any geometric shape suitable for the purpose.

The insert 9 may also have a mixed overall shape, for example a cylinder or a prism (cube) surmounted by a different solid geometric figure, such as a truncated cone or truncated pyramid or a different prism, etcetera, such as for example illustrated in FIGS. 11C to 11F For example, an insert 9 may consist in a cylinder portion surmounted by a truncated cone or a prismatic portion surmounted by a truncated pyramid.

The first zone or cavity 8 is arranged at a base of the insert 9.

This shows that the at least one seat 7 and/or the insert 9 thereof can be of any geometric shape, dimension, length, width or depth depending on the specific needs.

The shapes of the insert 9 and/or of the at least one seat 7 illustrated in FIGS. 11A to 11F can be applied to any further version of the present invention described and/or illustrated herein, without any limitations whatsoever.

Still, for example as visible in FIGS. 13 A to 15B, the at least one seat 7 may be obtained in a recessed zone 11 with respect to the second surface 3*b* of the socket 3. A similar situation may also occur as concerns the shank 2 and/or as concerns the outer surface 2*b* thereof, in which the at least one seat 7 can be obtained in a recessed zone 11' with respect to the outer surface 2*b* of the shank 2 (as illustrated in FIGS. 3 A to 6B, for example).

In such case, the base extension of such recessed zone 11 and/or at least one seat 7 has dimensions suitable to house at least one rotary means 4 and/or at least one insert 9.

The depth of the recessed zone 11 has a measurement d' that is smaller than or equal to the distance d by which the at least one rotary means 4 projects.

In an alternative version, the distance d' is greater than the distance d by which the at least one rotary means 4 projects.

Given that d'<d, at least one edge or containment element 16 of the at least one rotary means 4, which holds it in position but allows the rotation thereof according to all solutions described above, can be present. In such case, the opening through which the at least one rotary means projects also involves the edge or containment element 16.

Thus, there still arises the need to prevent or reduce direct contact between the shank 2 and the socket 3 to the minimum.

As regards the version illustrated in FIGS. 16A and 16B, the socket 3 is obtained by means of the base 3' that is flat-shaped, present on whose second surface 3*b* is at least one seat 7, in which at least one rotary means 4 is housed. Such at least one seat and at least one rotary means 4 is arranged at the zone where the shank 2 usually rests.

As observable from the image, arranged are inserts 9', provided with at least one seat 7', with at least one first zone or cavity 8' and at least one rotary means 4' arranged laterally to the zone on which the shank 2 usually lies, so as to prevent the shank 2 from laterally coming into contact with the lateral zone of the socket 3. Thus, in case of lateral oscillations, the shank 2 comes into contact with the rotary means 4' housed in the lateral inserts 9'. Thus, also in this case this allows a rolling friction of the shank 2 on the socket 3. Furthermore, the shank 2 and the socket 3 do not touch each other, not even in case of lateral oscillations.

Unless indicated otherwise, the characteristics of the at least one rotary means 4', of the at least one seat T and/or of the at least one insert 9' are similar to those of the at least one rotary means 4, of the at least one seat 7 and/or of the at least one insert 9.

As observed, thanks to the present invention, the at least one rotary means 4, 4', though being free to rotate by 360° along the entire spherical surface thereof, is not “free” or unconstrained, but rather constrained to the shank 2 and/or socket 3, thus obtaining the outlined advantages.

In a preferred version of the invention, each rotary means 4, 4' is single. i.e. it is surrounded by the seat 7, 7' and/or by the insert 9, 9' but it is not at direct contact with other rotary means 4, 4'.

This allows to have each rotary member independent from the other and thus capable of functioning and rotating freely, without being affected by other adjacent rotary means. Hence, in this manner, should one of such rotary means fail, the others can continue to rotate independently, completing the pre-set task. Thus, the rotary means 4 is inserted (at least partially) in the wall of the shank 2 and/or socket 3.

Furthermore, the positioning of the at least one rotary means 4 and providing and/or installing the at least one seat 7 occurs directly in the workshop that manufactures the radiant pipes TR and the socket, without having to intervene in the furnaces. In the solutions of the prior art, in which the rotary elements were present released from the shank and/or socket, this advantage cannot be obtained in that specialised operators were forced to mount such solutions from inside the furnace, during the shutdown times of the furnaces and by means of scaffoldings or climbing by specialised personnel even to considerable heights, exposing them to considerable safety risks. In addition, such operators were exposed to toxic gases and fumes in the furnaces, irrespective of whether of the vertical or horizontal type.

In addition, when cooling the pipe, it is for example subjected losing balance and thus being lifted by a few centimetres due to the loss of weight thereof. In this case, possible elements of the prior art devices, which are released from the shank and/or socket, could fall off or come out of their seats, with further risk for the operators and malfunctioning thereof.

Still, the present invention allows to obtain some major advantages:

- a substantial reduction of the friction stress between the shank and socket which is usually transferred to the radiant pipe; thanks to the present invention, the radiant pipe exerts a much lesser force due to expansion/extension during the heating and expansion steps with respect to the conventional solutions;
- extended maintenance of the mechanical creep strength characteristics (i.e., for example, resistance to tensile strength and/or the sliding, and/or the torsion and/or the extension) of the material over time;
- an ensuing greater durability of the radiant pipe-support device system of the radiant pipe according to the present invention;
- considerable reduction of the typical defaults of radiant pipes due to the stresses present in the current systems;
- reduction of the costs due to the reduction of the maintenance required for furnaces;
- greater safety for the operators operating and/or performing maintenance operations in the furnaces.

As a matter of fact, as regards the latter point, thanks to the present invention, maintenance operations on the furnaces have dropped considerably, thus reducing the risk of possible accidents for the operators. Furthermore, given that the radiant pipes last longer, the present invention allows to drastically reduce or cut the need of replacement thereof due to the default thereof.

The at least one rotary means 4 according to the present invention does not have constraint means such as pinions, shafts. Seeger rings or fixing rings, etcetera, in that they are held in position—and thus constrained to the shank and/or socket—only using the at least one seat and/or an insert thereof 9.

Furthermore, the at least one rotary means 4 lasts for many years, it does not require any maintenance and it can be re-utilised once the pipe reaches the end of natural life, re-installing it on a shank and/or socket of a new radiant pipe.

In at least one version of the invention, the at least one seat 7 and/or the insert 9 thereof is made of several pieces, for example two halves, so as to obtain the housing of the at least one rotary means 4 therein.

The insert 9 can be installed by inserting it into a special opening or suitable hole obtained in the wall of the shank 2 and/or socket 3.

In such case, the opening or hole (or the circular opening described above) can be obtained by means of laser cutting, machine cutting, by means of tool machines, etcetera.

Still, should the thickness 2*c* and/or 3*c* allow it, the insert 9 can be applied in the inner surface 2*a* (when present) and/or in the first surface 3 *a*. In such case, the cavity 8 is arranged at contact with such surface, at such cavity 8. Furthermore, a special opening from which a rotary means 4 projects by a distance d is obtained in the surface in question.

The seat 7 and/or the insert 9 are subjected, in at least one version of the invention, to precision mechanical machining with the aim of guaranteeing the fixing and/or the constraint in the shank 2 and/or socket 3.

In at least one version, the insert 9 is welded and/or fixed and/or obtained by melting, centrifuging the material or other method in holes specifically created on the shanks and/or sockets or on the shank and/or socket, in particular welded and/or fixed onto the outer surface 2*a* of the shank 2 and/or onto the second surface 3*b* of the socket 3. Even such operations take into account the heating and ensuing possible expansion of the materials forming the components in question, so as to prevent deformations.

On the other hand, having minimum or null dilatation with respect to the other materials (specifically due to the type of material they are made of) the rotary means do not suffer any problem in this sense.

In addition, it is possible that, in at least one version of the invention, between the at least rotary means 4 and the at least one seat 7 and/or the insert 9 thereof, there be established a natural magnetism due to the specific materials used (for example the socket can be made of a determined material while the shank can be made of any other specific material, considering the specific magnetic materials that also have the capacity of resistance to the high temperatures and hardness required of the invention). As a matter of fact, such materials can create a magnetism that allows them to repel against one another. For example, both materials can be charged positively (or both negatively), repelling against one another and/or respectively charged so as to create a magnetic field.

The material in question can be a previously magnetised material and it creates its own magnetic field. The materials that can be magnetised are called ferromagnetic; for example, they include iron, nickel, cobalt, etc.

The magnetic materials, for example permanent, consist of “hard” ferromagnetic materials subjected—during the production thereof—to a special treatment in a strong magnetic field, which aligns the internal micro-crystalline structure thereof and makes them extremely difficult to demagnetise.

This can allow to create, by means of magnetic materials or by means of other materials indicated in the present description a sort of air or appropriate inert gas bearing (or a bearing of a mixture thereof) which allows to keep the at least one rotary means 4 spaced with respect to the respective at least one seat 7 and/or insert 9 and/or to the surface on which such at least one rotary means 4 rolls. According to a version of the present invention, such bearing can be obtained by means of air or pressurised inert gas. For example, a jet of pressurised air or inert gas can be present in the shank 2 and/or socket 3 (jet flowing in from a special opening—not illustrated in the attached drawings—for example connected to a compressor which conveys the air or the gas for example at a pressure of 100 atmospheres and/or above). This allows to prevent the sticking between the at least one rotary means 4 and the surface on which it rolls, besides creating a distance between the at least one rotary means 4 and the seat 7 or insert 9 thereof. At the same time, thanks to the pressurised air or gas, it is possible to keep the sliding zone clean, clear of dust or other debris, thus enhancing the prevention of sticking between the various parts even further.

The gas in question can for example be nitrogen (or an air and nitrogen mixture, for example nitrogen up to 95%) considering the atmosphere that can be present in some furnaces.

Still, using the pressurised nitrogen, and using such element applied onto the shank 2 and/or onto the socket 3, besides the effect of the bearing described above, it is possible to determine a cooling of the involved surfaces, thus preventing the friction or sticking phenomena between the various surfaces even further. The surface thus cooled could take a temperature of about 850° C. or less. This further guarantees the housing, the fixing and/or the engagement of the at least one rotary means 4 in the at least one seat 7. This allows preventing the accidental release of the latter two components.

Still, should the at least one rotary means 4 be installed in a seat 7 obtained directly in the shank 2 and/or in the socket 3, a cavity 8 suitable to insert the rotary means 4 is provided in at least one of such components. Then, edges or containment elements 16 of the at least one rotary means 4, that constrain it in position but allow the rotation thereof according to all the solutions described above can be fixed to the sides of the cavity 8.

When the at least one rotary means must be inserted directly into a seat 7 (or recess 11) obtained in the wall of the shank 2 and/or socket 3, the opening or hole (of the cavity 8) must be at least slightly larger than the section that passes through the equator or, considering the section thereof, the diameter of the at least one rotary means 4. As mentioned, at least one edge or containment element 16 will also be provided for holding the at least one rotary means 4 in position. In this case, the opening of the present edge or containment element 16 will have a diameter smaller than the diameter of the rotary element 4, so that it projects by a distance d but it is not released from the seat 7.

Such edges or containment elements 16 are, in at least one version, machined using a tool machine and/or made using a material with a minimum extension at high temperatures.

Obviously, such edges or containment elements have a special hole or opening from which a part of rotary means 4 projects by a distance d as described above. Holes for the through-flow and/or suctioning air at such components can be provided for at the seat 7 and/or the insert 9 and/or at least one edge or containment element 16 and thus the rotary means 4: this allows having recirculation of air when operating at high temperatures (thus a given degree, though small, of cooling in the area in question).

Such holes can also be provided to guarantee a cleaning of the system should dust or other materials present in the atmosphere of the furnaces potentially enter thereinto and/or, thus, the possible mechanical removal of dust that may have deposited over time in such seats, for example by blowing high pressure air when the furnace is shut down to remove the deposited dust and/or residues.

An example of such holes is indicated with reference number 19 and it is illustrated in FIGS. 11C to 11F (considered also applicable to FIGS. 11 A, 11B and to the other versions of the present invention) in which it is positioned in apical position of the at least one seat 7 and/or of the at least one insert 9.

Such hole 19 passes through and/or places the cavity 8 in communication with the external space of the at least one seat 7 and/or of the at least one insert 9.

Thus, as observable from the description above, the at least one rotary means is positioned between the shank 2 and socket 3.

Generally, the section of the socket 3 is mainly but not necessarily larger than that of the shank 2, so as to allow the insertion and/or the housing of the latter in the socket 3 or in proximity thereof.

On the contrary, the at least one rotary means has a smaller overall dimension or is smaller in size with respect to the dimension of the socket or of the shank.

For example, the distance d by which the rotary means 4 projects can be comprised between 1 and 10 mm or between 0.1 mm and 3 cm (generally between 3 and 6 mm).

It has thus been observed that the invention attains the pre-set objectives.

Though the present invention has been described according to preferred embodiments, equivalent variants may be conceived without departing from the scope of protection offered by the claims that follow. Furthermore, the characteristics described regarding a version or embodiment or configuration of one of the components of the present invention, can be present in other variants or embodiments or configurations of one or more of the components of the present invention, without departing from the scope of protection offered by the claims that follow.

The invention claimed is:

1. A support device for a radiant pipe, usable in thermal treatment furnaces, for continuous lines for galvanising and annealing strips or plates made of metal sheet and/or other products made of steel and/or other metals or for revamping pre-existing furnaces, comprising:

- a support for radiant pipe or shank and a furnace-side support or socket,
- wherein said support for radiant pipe or shank comprises at least one outer surface, directed during use towards the furnace-side support or socket, an inner surface and a thickness, wherein said thickness corresponds to a distance between the inner surface and the outer surface,
- wherein said furnace-side support or socket comprises at least one first surface and one second surface, the latter directed during use towards the support for radiant pipe or shank, and a thickness, wherein said thickness corresponds to a distance between the first surface and the second surface,
- at least one rotary means and at least one seat for housing said at least one rotary means, wherein said housing seat has a circular opening, wherein said at least one rotary means is positioned by means of said at least one seat within said support for radiant pipe or shank and/or said thickness of said support for radiant pipe or shank and/or is positioned within said furnace-side support or socket and/or said thickness of said furnace-side support or socket, so that said at least one rotary means determines the support of said support for radiant pipe or shank on said furnace-side support or socket and a rolling friction between said support for radiant pipe or shank and said furnace-side support or socket, said at least one rotary means being rotatably constrained within said at least one seat, wherein said at least one rotary means projects from outer surface of the shank and/or from the second surface of the socket and projects from said opening of said housing seat by a distance and wherein between said at least one rotary means and said at least one housing seat, a gap is present during use that allows the rotation of said at least one rotary means and the maintenance thereof within said at least one housing seat, wherein said at least one seat is shaped in a manner such to house said at least one rotary means and constrain said at least one rotary means within said shank and/or socket, simultaneously allowing rolling along an entire surface of said at least one rotary means.

2. The support device according to claim 1, wherein on at least part of said second surface of said socket during use said shank is supported and/or in contact with and/or is moved by means of interposition of said at least one rotary means and/or wherein said shank is movable and/or slidable within said socket or on said socket by means of said at least one rotary means and/or wherein said at least one rotary means is suitable to allow the support of the radiant pipe and/or its sliding and/or oscillation movements.

3. The support device according to claim 1, wherein said at least one rotary means comprises a spheroid element or a spherical element or a substantially spherical element, and/or a sphere, a ball, a wheel or a marble and/or wherein said opening of said at least one housing seat faces towards the other, between said shank or socket, with respect to the shank or socket on which it is positioned.

4. The support device according to claim 1, wherein said at least one seat is positioned in said shank and/or in the thickness of said shank and/or in said socket and/or in the thickness of said socket and/or wherein said at least one seat is positioned with a zone that is recessed with respect to said second surface of the socket, wherein said recessed zone has a depth that is greater than or smaller than or equal to said distance, and/or with respect to said outer surface of the shank.

5. The support device according to claim 1, wherein said at least one seat comprises a first zone or cavity, wherein said first zone or cavity has a shape corresponding to that of the at least one rotary means and/or has a surface substantially shaped as a spherical cap, with a size slightly greater than that of the at least one rotary means.

6. The support device according to claim 1, wherein said at least one rotary means is inserted into said at least one seat and/or the first zone or cavity for about half of the volume thereof or diameter thereof and/or for slightly less than half outside said shank and/or socket, determining said distance (d).

7. The support device according to claim 1, wherein said at least one seat and/or said at least one insert comprises a first zone or cavity having a shape with curved sections and/or flat sections, each flat section being tilted with respect to adjacent sections, so as to create a space capable of retaining, therein, said at least one rotary means and simultaneously allowing the rotation thereof, or wherein said at least one seat and/or said at least one insert comprises a first zone or cavity having curved shape and a second zone opposite said first zone or cavity having a shape with curved sections and/or flat sections, each section being tilted with respect to adjacent sections, so as to create a space capable of retaining, therein, said at least one rotary means and simultaneously allowing the rotation thereof.

8. The support device according to claim 1, wherein said insert is made of several pieces or two halves, in order to allow the housing, therein, of the at least one rotary means.

9. The support device according to claim 1, wherein said socket comprises a body having a shape that is substantially tubular, substantially semi-tubular or curved or substantially flat or any other shape suitable to allow the reception of said shank and/or with a circular or polygonal section, and/or wherein said shank comprises a body having a shape that is substantially tubular or semi-circular or semi-cylindrical or U-shaped or substantially flat or substantially cylindrical and/or with a circular or polygonal section, and/or wherein said shank comprises an inner surface, opposite the outer surface and/or wherein at least one of said outer surface and said inner surface have a shape that is substantially tubular or semi-circular or semi-cylindrical or U-shaped or substantially flat, and/or wherein said external surface and the inner surface are substantially parallel and/or superimposed on each other, and/or wherein said thickness corresponds to the distance between outer surface and inner surface or to the diameter or to the width of the substantially cylindrical body of said shank.

10. The support device according to claim 1, wherein said first surface is opposite to said second surface of said socket and/or wherein said first surface and said second surface of said socket have a shape that is substantially tubular or semi-tubular and/or curved or substantially U-shaped, or they are substantially flat and/or they are substantially parallel and superimposed on each other, and/or wherein said first surface and said second surface are coaxial with each other and/or said thickness corresponds to the distance between first surface and second surface.

11. The support device according to claim 1, wherein said outer surface of said shank comprises at least one edge or containment element suitable, during use, to hold said at least one rotary means in position.

12. The support device according to claim 1, wherein said at least one rotary means is made of a composite material, wherein said composite material having a coefficient of thermal expansion comprised between 0 mm and 5 cm, or between 0 and 5 mm, or between 0 and 15 mm, and/or having a resistance to the vertical stress equal to over 20 tons per inch or 20 tons per 2.54 cm, and/or has a resistance to temperatures up to 1300° C. and/or up to a maximum of 2000° C. or beyond and/or a hardness comprised between 20 HRC and 70 HRC or beyond up to a maximum of about 75/80 HRC.

13. The support device according to claim 1, wherein said support for radiant pipe or shank and/or said furnace-side support or socket are made of a metal material resistant to high temperatures, an austenitic steel material, a high or low nickel content steel material (or high nickel alloy), a ceramic material, a silicon carbide material, a nickel and chromium alloy, an iron, chromium and aluminium alloy, a metal material and/or a metal alloy comprising an element that is tungsten, cobalt, yttrium, molybdenum, or a material containing and/or derived from cast iron, a high nickel content cast iron, a cast metal material, with or without nickel, chromium, aluminium components, or wherein said socket is made with bricks, stone, materials consisting of insulating material or refractory materials.

14. The support device according to claim 1, wherein said at least one rotary means and said at least one seat and/or said insert are made of at least one of the following materials: an anti-friction material, a ferrous material, a non-ferrous material comprising nickel, a material containing ceramic particles of zirconium, silica, nitrides, alumina or other materials suitable for avoiding sticking with said shank and/or socket or made of silica nitride, a magnetic and/or magnetised material, a ferromagnetic material including iron, nickel, cobalt, or a material suitable to establish a magnetism, so that said at least one rotary means repels said at least one seat and/or said insert thereof.

15. The support device according to claim 1, wherein said at least one seat is positioned by means of an insert in turn inserted into and/or applied and/or connected and/or fixed and/or installed on said shank and/or said socket and/or said thickness and/or said thickness.

16. The support device according to claim 1, wherein said insert is made in at least one of the following materials: steel material, cold rolled material, hot rolled material, a composite material, a ceramic material, a material resistant to high temperatures, a material having a coefficient of thermal expansion corresponding to that of the shank and/or of the socket in which it is inserted, a metal material, a nickel and chromium alloy, an iron alloy, chromium and aluminium, a metal alloy comprising an element that is tungsten, cobalt, yttrium, molybdenum, a material containing and/or derived from cast iron, high nickel content cast iron, silicon carbides.

17. The support device according to claim 1, wherein said at least one insert is inserted into a suitable opening or a suitable hole made in said shank and/or socket and/or said at least one insert is applied in the inner surface and/or in the first surface, said cavity is arranged at contact with said inner surface and/or first surface and, in said inner surface and/or first surface, at such cavity, a corresponding circular opening is present from which said at least one rotary means protrudes by the distance (d).

18. The support device according to claim 1, wherein between said at least one rotary means and said at least one seat and/or said insert thereof, there is a bearing of air and/or suitable inert gas, such as nitrogen, or of an air and/or gas mixture, possibly wherein said air and/or said inert gas are pressurised, so as to keep said at least one rotary means spaced with respect to said at least one seat and/or with respect to said insert and/or to the surface on which said at least one rotary means rolls.

19. A support device for a radiant pipe, usable in thermal treatment furnaces, for continuous lines for galvanising and annealing strips or plates made of metal sheet and/or other products made of steel and/or other metals or for revamping pre-existing furnaces, comprising:

a support for radiant pipe or shank and a furnace-side support or socket, wherein said support for radiant pipe or shank comprises at least one outer surface, directed during use towards the furnace-side support or socket, an inner surface and a thickness, wherein said thickness corresponds to a distance between the inner surface and the outer surface, wherein said furnace-side support or socket comprises at least one first surface and one second surface, the latter directed during use towards the support for radiant pipe or shank, and a thickness, wherein said thickness corresponds to a distance between the first surface and the second surface, at least one rotary means and at least one seat for housing said at least one rotary means, wherein said housing seat has a circular opening, wherein said at least one rotary means is positioned by means of said at least one seat within said support for radiant pipe or shank and/or said thickness of said support for radiant pipe or shank and/or is positioned within said furnace-side support or socket and/or said thickness of said furnace-side support or socket, so that said at least one rotary means determines the support of said support for radiant pipe or shank on said furnace-side support or socket and a rolling friction between said support for radiant pipe or shank and said furnace-side support or socket, wherein said at least one rotary means comprises a substantially spherical element, said at least one rotary means being rotatably constrained within said at least one seat, wherein said at least one rotary means projects from outer surface of the shank and/or from the second surface of the socket and projects from said opening of said housing seat by a distance and wherein between said at least one rotary means and said at least one housing seat, a gap is present during use that allows the rotation of said at least one rotary means and the maintenance thereof within said at least one housing seat, wherein said at least one seat is shaped in a manner such to house said at least one rotary means and constrain said at least one rotary means within said shank and/or socket, simultaneously allowing rolling along an entire surface of said at least one rotary means, wherein said at least one seat comprises a first zone or cavity having a shape corresponding to that of the at least one rotary means.

20. A support device for a radiant pipe, usable in thermal treatment furnaces, for continuous lines for galvanising and annealing strips or plates made of metal sheet and/or other products made of steel and/or other metals or for revamping pre-existing furnaces, comprising:

a support for radiant pipe or shank and a furnace-side support or socket, wherein said support for radiant pipe or shank comprises at least one outer surface, directed during use towards the furnace-side support or socket, an inner surface and a thickness, wherein said thickness corresponds to a distance between the inner surface and the outer surface, wherein said furnace-side support or socket comprises at least one first surface and one second surface, the latter directed during use towards the support for radiant pipe or shank, and a thickness, wherein said thickness corresponds to a distance between the first surface and the second surface, at least one rotary means and at least one seat for housing said at least one rotary means, wherein said housing seat has a circular opening, wherein said at least one rotary means is positioned by means of said at least one seat within said support for radiant pipe or shank and/or said thickness of said support for radiant pipe or shank and/or is positioned within said furnace-side support or socket and/or said thickness of said furnace-side support or socket, so that said at least one rotary means determines the support of said support for radiant pipe or shank on said furnace-side support or socket and a rolling friction between said support for radiant pipe or shank and said furnace-side support or socket, wherein said at least one rotary means comprises a substantially spherical element and wherein each of said at least one housing seat houses a single substantially spherical element, said at least one rotary means being rotatably constrained within said at least one seat, wherein said at least one rotary means projects from outer surface of the shank and/or from the second surface of the socket and projects from said opening of said housing seat by a distance and wherein between said at least one rotary means and said at least one housing seat, a gap is present during use that allows the rotation of said at least one rotary means and the maintenance thereof within said at least one housing seat, wherein said at least one seat is shaped in a manner such to house said at least one rotary means and constrain said at least one rotary means within said shank and/or socket, simultaneously allowing rolling along an entire surface of said at least one rotary means, wherein said at least one seat comprises a first zone or cavity having a shape corresponding to that of the at least one rotary means and said at least one seat comprises an insert installed on said support for radiant pipe or shank and/or said furnace-side support or socket.

* * * * *